(12) United States Patent
Gentric

(10) Patent No.: US 12,007,951 B2
(45) Date of Patent: Jun. 11, 2024

(54) DEVICES, SYSTEM AND METHOD FOR SYNCHRONIZING CHANGES, DELETIONS OR ADDITIONS TO FIELDS AT DATABASES

(71) Applicant: AMADEUS S.A.S., Biot (FR)

(72) Inventor: Philippe Gentric, Biot (FR)

(73) Assignee: AMADEUS S.A.S., SOPHIA ANTIPOLIS, Biot (FR)

( * ) Notice: Subject to any disclaimer, the term of this patent is extended or adjusted under 35 U.S.C. 154(b) by 172 days.

(21) Appl. No.: 17/558,315

(22) Filed: Dec. 21, 2021

(65) Prior Publication Data

US 2023/0195696 A1 Jun. 22, 2023

(51) Int. Cl.
| | |
|---|---|
| *G06F 16/178* | (2019.01) |
| *G06F 16/16* | (2019.01) |
| *G06F 16/17* | (2019.01) |
| *G06F 16/182* | (2019.01) |

(52) U.S. Cl.
CPC .......... *G06F 16/178* (2019.01); *G06F 16/164* (2019.01); *G06F 16/1734* (2019.01); *G06F 16/184* (2019.01)

(58) Field of Classification Search
CPC .. G06F 16/178; G06F 16/164; G06F 16/1734; G06F 16/184
See application file for complete search history.

(56) References Cited

FOREIGN PATENT DOCUMENTS

| CN | 111339143 A | * | 6/2020 | ....... G06F 16/24552 |
| EP | 3772692 A1 | | 2/2021 | |
| RU | 2438263 C2 | * | 12/2011 | ............. G06F 16/27 |

* cited by examiner

*Primary Examiner* — Hosain T Alam
*Assistant Examiner* — Anthony G Gemignani
(74) *Attorney, Agent, or Firm* — PERRY + CURRIER, INC.

(57) ABSTRACT

A device, system and method for synchronizing databases changes is provided. A change-indication bit-vector indicates a position of a change to a stored data-set and/or a respective key position defined by a data-set representation (DSR) that defines a data-set structure. When the change comprises a data-field deletion, an indication of the change-indication bit-vector is provided to a replication node managing a replica database storing a replica data-set; the replication node updates the replica and a respective DSR to show the deletion at the indicated position. When the change comprises a data-field addition, the indication of the change-indication bit-vector and a record of a key value of a new data field and a data value of the new data field, is provided to the replication database; the replication node updates the replica and the respective DSR to show the addition at the indicated position.

17 Claims, 25 Drawing Sheets

DEVICES, SYSTEM AND METHOD FOR SYNCHRONIZING CHANGES, DELETIONS OR ADDITIONS TO FIELDS AT DATABASES

BACKGROUND

Presently, data may be stored at a first database and replicated at a second database, or vice versa. For databases with large datasets and frequent changes to the datasets, such as changes to fields at the datasets and/or deletion of fields at the datasets and/or addition of fields at the datasets, synchronizing such changes and/or deletions and/or additions may lead to large bandwidth usage, which generally wastes network resources and/or processing resources.

SUMMARY

A first aspect of the present specification provides a method comprising: determining, at a computing node, that a stored data-set at a primary database has changed, the stored data-set comprising a plurality of data fields arranged in a predetermined layout defined according to a data-set representation (DSR) structure that defines for a given data-set, a structure of data fields which are associated with respective keys of the DSR structure, a change to the stored data-set comprising a deletion of an existing data field or an addition of a new data field; determining, at the computing node, a change indication bit-vector indicating one or more of a position of the change at the stored data-set and a respective key position defined by the DSR structure; when the change comprises the deletion of the existing data field, providing, to a replication node managing a replica database storing a replica of the stored data-set, an indication of the change indication bit-vector, such that the replication node updates the replica and a respective DSR structure to show deletion of the existing data field at the position indicated by the change indication bit-vector; and when the change comprises the addition of the new data field, providing, to the replication node, the indication of the change indication bit-vector and a record of a key value of the new data field and a data value of the new data field, such that the replication node updates the replica and the respective DSR structure to show the addition of the new data field at the position indicated by the change indication bit-vector.

At the first aspect, the indication of the change indication bit-vector may comprise a plurality of bits arranged serially, each of the plurality of bits corresponding to a respective key position of the DSR structure.

At the first aspect, the indication of the change indication bit-vector may comprise a plurality of bits arranged serially, each of the plurality of bits corresponding to a respective key position of the DSR structure, and a bit of the plurality of bits that indicates the position of the change has a first binary value, and other bits of the plurality of bits has a second binary value.

At the first aspect, the record may further comprise one or more of a length of the key value, a length of the data value of the new data field, a respective length of the new data field, and a data type of the new data field.

At the first aspect, the method may further comprise compressing the indication of the change indication bit-vector prior to providing the change indication bit-vector to the replication node using one or more of a compression algorithm, run length encoding and variable length encoding.

At the first aspect, when the addition of the new data field is indicated at an end of the DSR structure, the indication of the change indication bit-vector may comprise the record.

At the first aspect, when the addition of the new data field is indicated other than at an end of the DSR structure, the indication of the change indication bit-vector may comprise the record and the change indication bit-vector in a compressed, or uncompressed format.

At the first aspect, when the addition of the new data field is indicated other than at an end of the DSR structure, the addition of the new data field may occur at a respective position of the stored data-set that corresponds to a previously deleted data field or a previously unused data field.

At the first aspect, when the change comprises both the deletion of the existing data field and the addition of the new data field, the change indication bit-vector may indicate respective positions of both the deletion and the addition.

A second aspect of the specification provides a computing node comprising: a processing module configured to: determine that a stored data-set at a primary database has changed, the stored data-set comprising a plurality of data fields arranged in a predetermined layout defined according to a data-set representation (DSR) structure that defines for a given data-set, a structure of data fields which are associated with respective keys of the DSR structure, a change to the stored data-set comprising a deletion of an existing data field or an addition of a new data field; determine a change indication bit-vector indicating one or more of a position of the change at the stored data-set and a respective key position defined by the DSR structure; when the change comprises the deletion of the existing data field, provide, to a replication node managing a replica database storing a replica of the stored data-set, an indication of the change indication bit-vector, such that the replication node updates the replica and a respective DSR structure to show deletion of the existing data field at the position indicated by the change indication bit-vector; and when the change comprises the addition of the new data field, provide, to the replication node, the indication of the change indication bit-vector and a record of a key value of the new data field and a data value of the new data field, such that the replication node updates the replica and the respective DSR structure to show the addition of the new data field at the position indicated by the change indication bit-vector.

At the second aspect, the indication of the change indication bit-vector may comprise a plurality of bits arranged serially, each of the plurality of bits corresponding to a respective key position of the DSR structure.

At the second aspect, the indication of the change indication bit-vector may comprise a plurality of bits arranged serially, each of the plurality of bits corresponding to a respective key position of the DSR structure, and a bit of the plurality of bits that indicates the position of the change has a first binary value, and other bits of the plurality of bits have a second binary value.

At the second aspect, the record may further comprise one or more of a length of the key value, a length of the data value of the new data field, a respective length of the new data field, and a data type of the new data field.

At the second aspect, the processing module may be further configured to compress the indication of the change indication bit-vector prior to providing the change indication bit-vector to the replication node using one or more of a compression algorithm, run length encoding and variable length encoding.

At the second aspect, when the addition of the new data field is indicated at an end of the DSR structure, the indication of the change indication bit-vector may comprise the record.

At the second aspect, when the addition of the new data field is indicated other than at an end of the DSR structure, the indication of the change indication bit-vector may comprise the record and the change indication bit-vector in a compressed, or uncompressed format.

At the second aspect, when the addition of the new data field is indicated other than at an end of the DSR structure, the addition of the new data field may occur at a respective position of the stored data-set that corresponds to a previously deleted data field or a previously unused data field.

At the second aspect, when the change comprises both the deletion of the existing data field and the addition of the new data field, the change indication bit-vector indicates respective positions of both the deletion and the addition.

A third aspect of the method comprises: determining, at a computing node, that a stored data-set at a primary database has changed, the stored data-set comprising a plurality of data fields arranged in a predetermined layout defined according to a data-set representation (DSR) structure that defines for a given data-set, a structure of data fields which are associated with respective keys of the DSR structure, a change to the stored data-set comprising a deletion of an existing data field or an addition of a new data field; determining, at the computing node, a change indication bit-vector indicating one or more of a position of the change at the stored data-set and a respective key position defined by the DSR structure; when the change comprises the deletion of the existing data field, providing, to a replication node managing a replica database storing a replica of the stored data-set, an indication of the change indication bit-vector, such that the replication node updates the replica and a respective DSR structure to show deletion of the existing data field at the position indicated by the change indication bit-vector; and when the change comprises the addition of the new data field, providing, to the replication node, the indication of the change indication bit-vector and a record of a key value of the new data field and a data value of the new data field, such that the replication node updates the replica and the respective DSR structure to show the addition of the new data field at the position indicated by the change indication bit-vector.

At the third aspect, the indication of the change indication bit-vector may comprise a plurality of bits arranged serially, each of the plurality of bits corresponding to a respective key position of the DSR structure.

At the third aspect, the indication of the change indication bit-vector may comprise a plurality of bits arranged serially, each of the plurality of bits corresponding to a respective key position of the DSR structure, and a bit of the plurality of bits that indicates the position of the change has a first binary value, and other bits of the plurality of bits has a second binary value.

At the third aspect, the record may further comprise one or more of a length of the key value, a length of the data value of the new data field, a respective length of the new data field, and a data type of the new data field.

At the third aspect, the method may further comprise compressing the indication of the change indication bit-vector prior to providing the change indication bit-vector to the replication node using one or more of a compression algorithm, run length encoding and variable length encoding.

At the third aspect, when the addition of the new data field is indicated at an end of the DSR structure, the indication of the change indication bit-vector may comprise the record.

At the third aspect, when the addition of the new data field is indicated other than at an end of the DSR structure, the indication of the change indication bit-vector may comprise the record and the change indication bit-vector in a compressed, or uncompressed format.

At the third aspect, when the addition of the new data field is indicated other than at an end of the DSR structure, the addition of the new data field may occur at a respective position of the stored data-set that corresponds to a previously deleted data field or a previously unused data field.

At the third aspect, when the change comprises both the deletion of the existing data field and the addition of the new data field, the change indication bit-vector indicates respective positions of both the deletion and the addition.

A fourth aspect of the present specification provides a computing node comprising: a processing module configured to: determine that a stored data-set at a primary database has changed, the stored data-set comprising a plurality of data fields arranged in a predetermined layout defined according to a data-set representation (DSR) structure that defines for a given data-set, a structure of data fields which are associated with respective keys of the DSR structure, a change to the stored data-set comprising a deletion of an existing data field or an addition of a new data field; determine a change indication bit-vector indicating one or more of a position of the change at the stored data-set and a respective key position defined by the DSR structure; when the change comprises the deletion of the existing data field, provide, to a replication node managing a replica database storing a replica of the stored data-set, an indication of the change indication bit-vector, such that the replication node updates the replica and a respective DSR structure to show deletion of the existing data field at the position indicated by the change indication bit-vector; and when the change comprises the addition of the new data field, provide, to the replication node, the indication of the change indication bit-vector and a record of a key value of the new data field and a data value of the new data field, such that the replication node updates the replica and the respective DSR structure to show the addition of the new data field at the position indicated by the change indication bit-vector.

At the fourth aspect, the indication of the change indication bit-vector may comprise a plurality of bits arranged serially, each of the plurality of bits corresponding to a respective key position of the DSR structure.

At the fourth aspect, the indication of the change indication bit-vector may comprise a plurality of bits arranged serially, each of the plurality of bits corresponding to a respective key position of the DSR structure, and a bit of the plurality of bits that indicates the position of the change has a first binary value, and other bits of the plurality of bits has a second binary value.

At the fourth aspect, the record may further comprise one or more of a length of the key value, a length of the data value of the new data field, a respective length of the new data field, and a data type of the new data field.

At the fourth aspect, the processing module may be further configured to compress the indication of the change indication bit-vector prior to providing the change indication bit-vector to the replication node using one or more of a compression algorithm, run length encoding and variable length encoding.

At the fourth aspect, when the addition of the new data field is indicated at an end of the DSR structure, the indication of the change indication bit-vector may comprise the record.

At the fourth aspect, when the addition of the new data field is indicated other than at an end of the DSR structure, the indication of the change indication bit-vector may comprise the record and the change indication bit-vector in a compressed, or uncompressed format.

At the fourth aspect, when the addition of the new data field is indicated other than at an end of the DSR structure, the addition of the new data field may occur at a respective position of the stored data-set that corresponds to a previously deleted data field or a previously unused data field.

At the fourth aspect, when the change comprises both the deletion of the existing data field and the addition of the new data field, the change indication bit-vector indicates respective positions of both the deletion and the addition.

BRIEF DESCRIPTIONS OF THE DRAWINGS

For a better understanding of the various examples described herein and to show more clearly how they may be carried into effect, reference will now be made, by way of example only, to the accompanying drawings in which.

Figure 18:
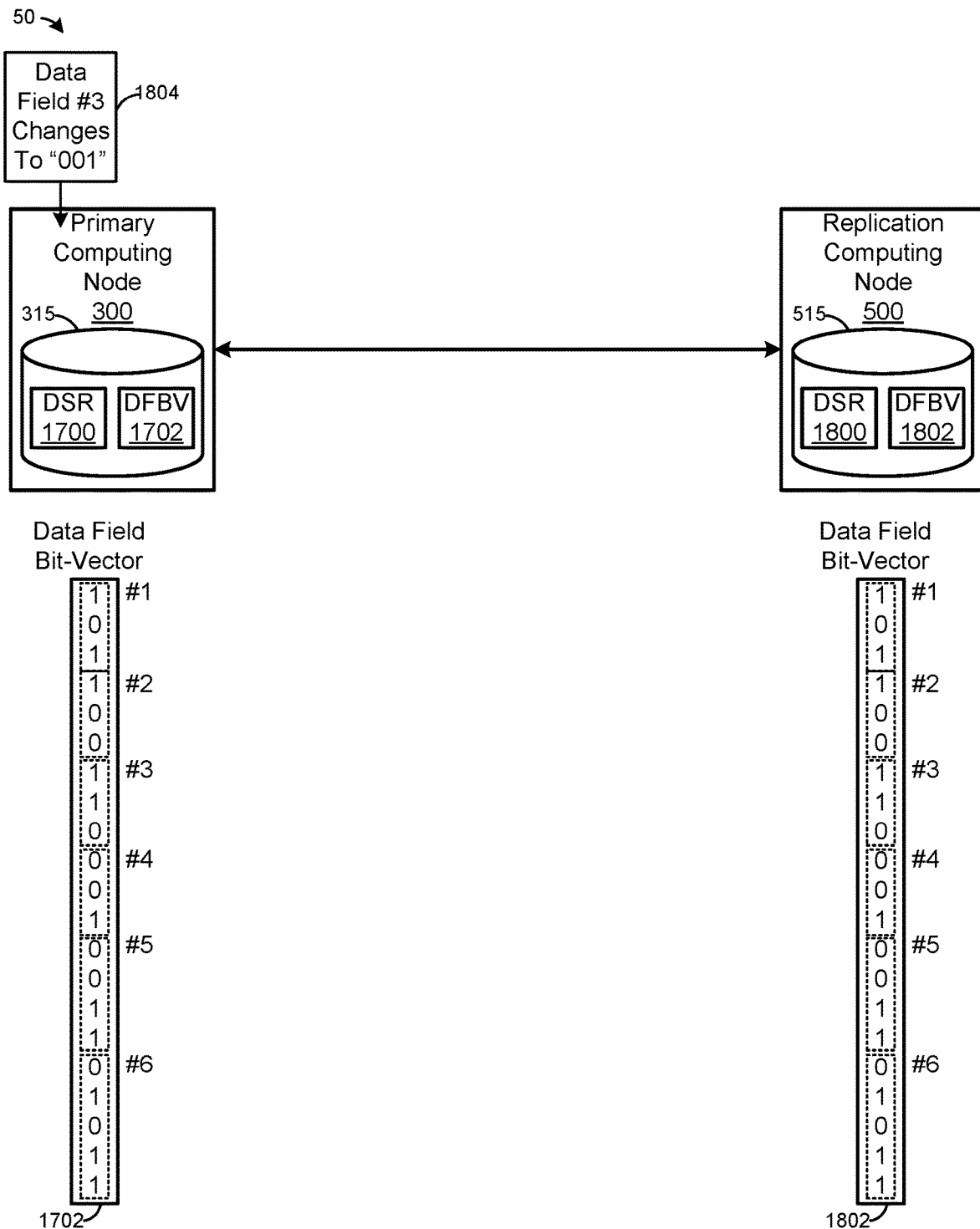
FIG. 18 depicts a portion of the system of FIG. 1, showing a same stored data-set, in the form of respective data field bit-vectors, stored at databases of a primary computing node to a replication computing node, with a change message being received at the primary computing node, according to non-limiting examples.
Figure 19:
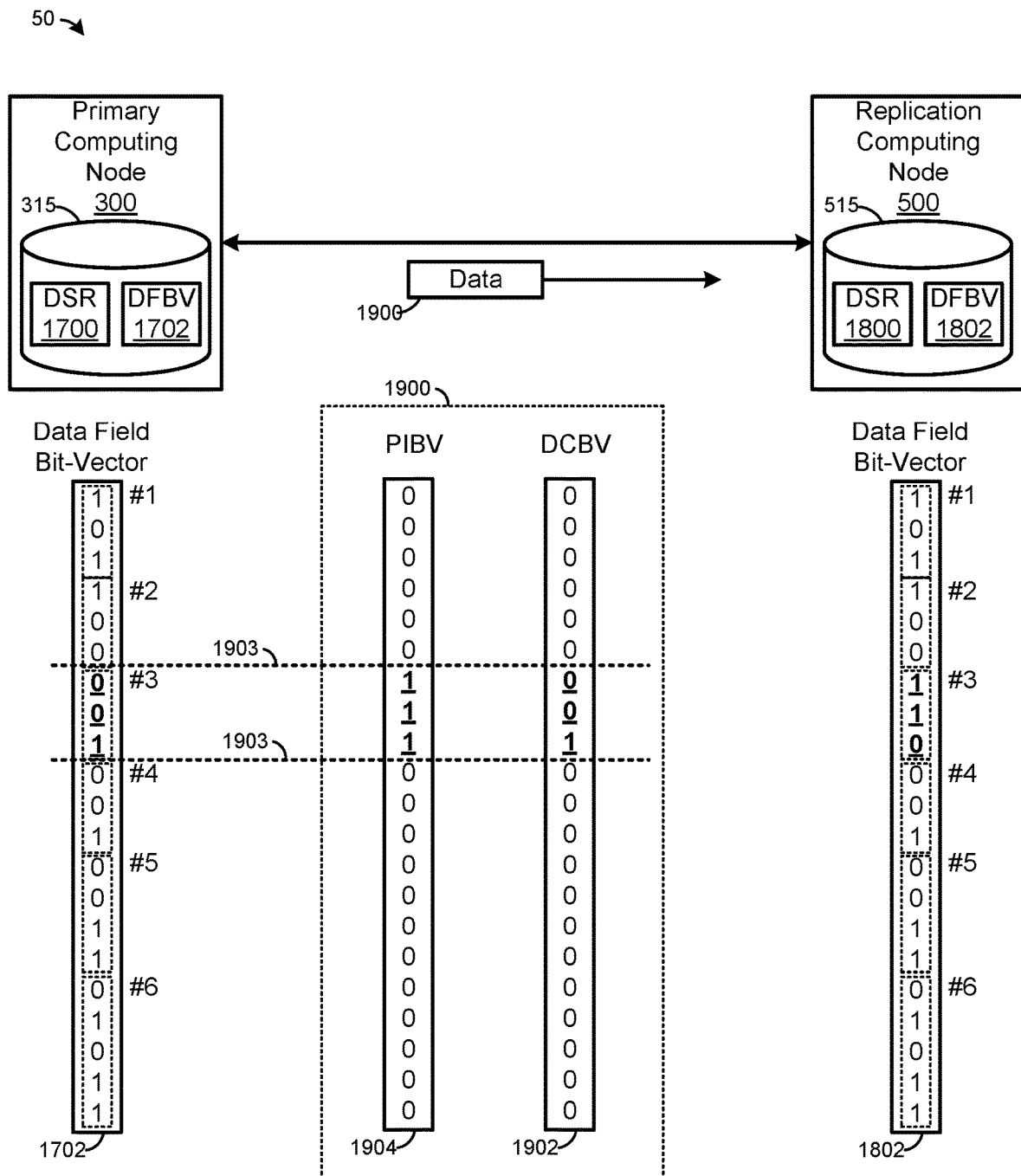

FIG. 19 depicts the system as depicted in FIG. 18, with the primary computing node changing a given data field of a respective data field bit-vector, according to the change message, and providing, to the replication computing node, synchronization data comprising a data change bit-vector, indicating changed data values at positions corresponding to a location of the given data field at which the change occurred, and a position indication bit-vector indicating the one or more positions of the changed data value at the data change bit-vector, according to non-limiting examples.

Figure 20:
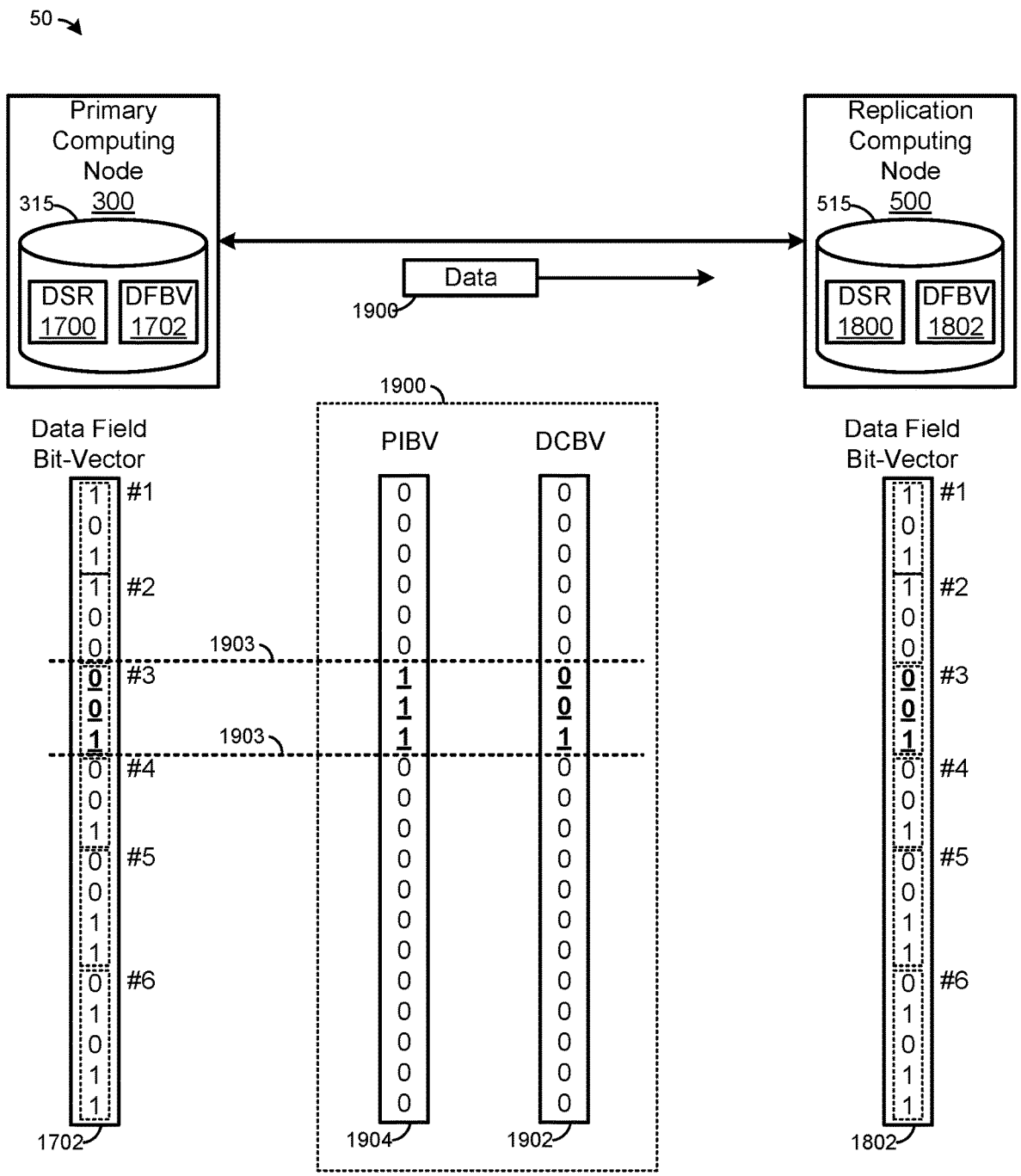

FIG. 20 depicts the system as depicted in FIG. 18, with the replication computing node synchronizing the respective given data field of a respective data field bit-vector based on the data change bit-vector and the position indication bit-vector, according to non-limiting examples.

Figure 21:
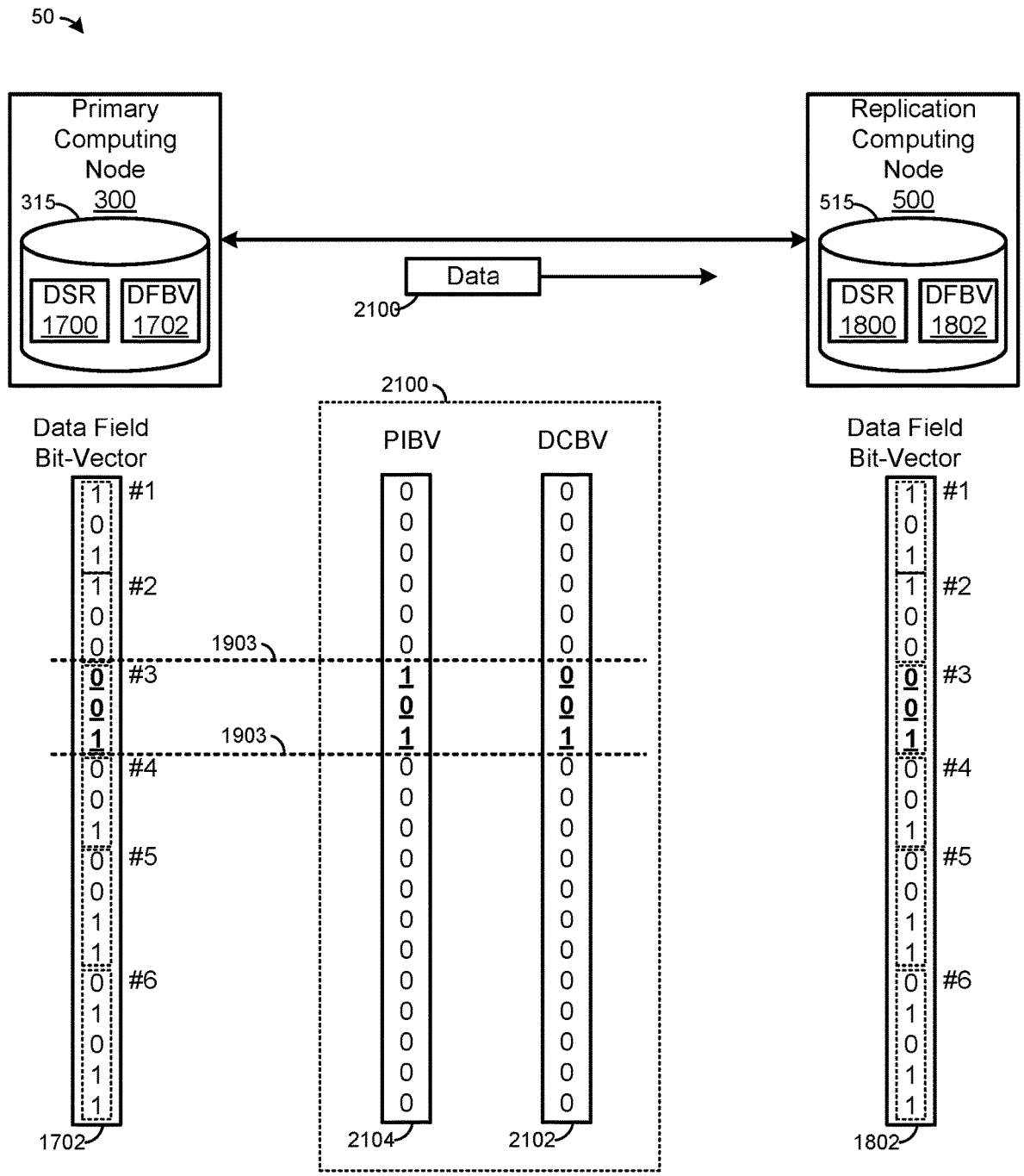

FIG. 21 depicts an example of an alternative position indication bit-vector, according to non-limiting examples.

Figure 22:
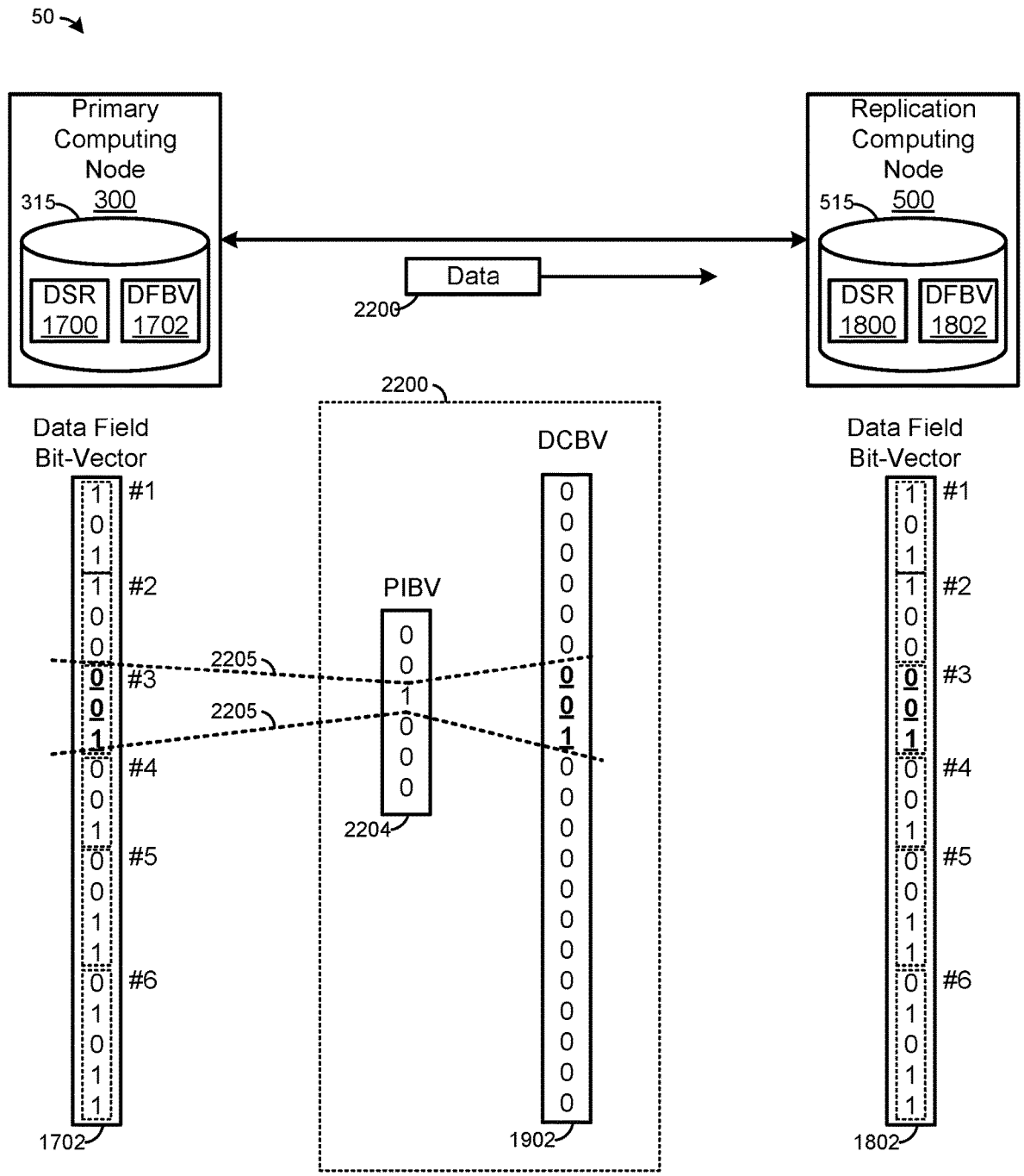

FIG. 22 depicts an example of yet another alternative position indication bit-vector, according to non-limiting examples.

Figure 1:
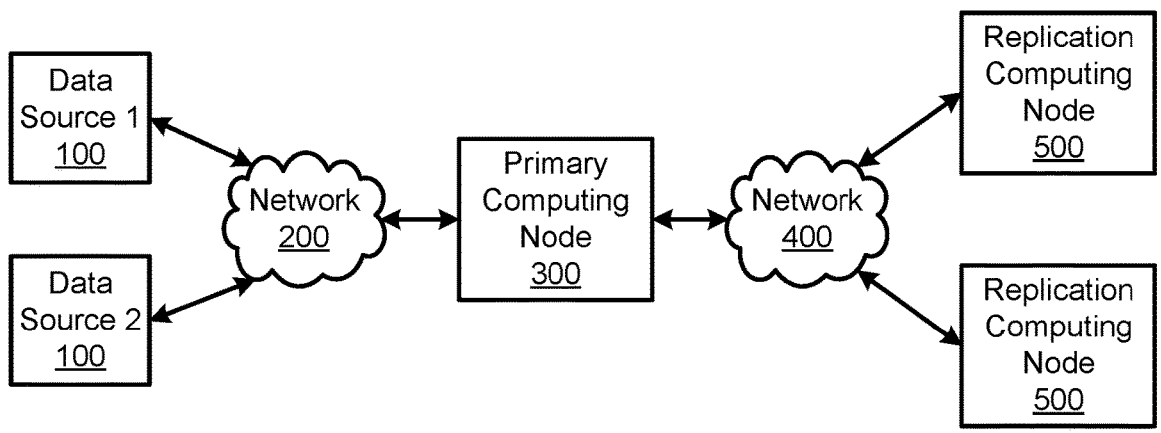
FIG. 1 depicts a system for synchronizing changes, deletions or additions to fields at databases, according to non-limiting examples.
Figure 23:
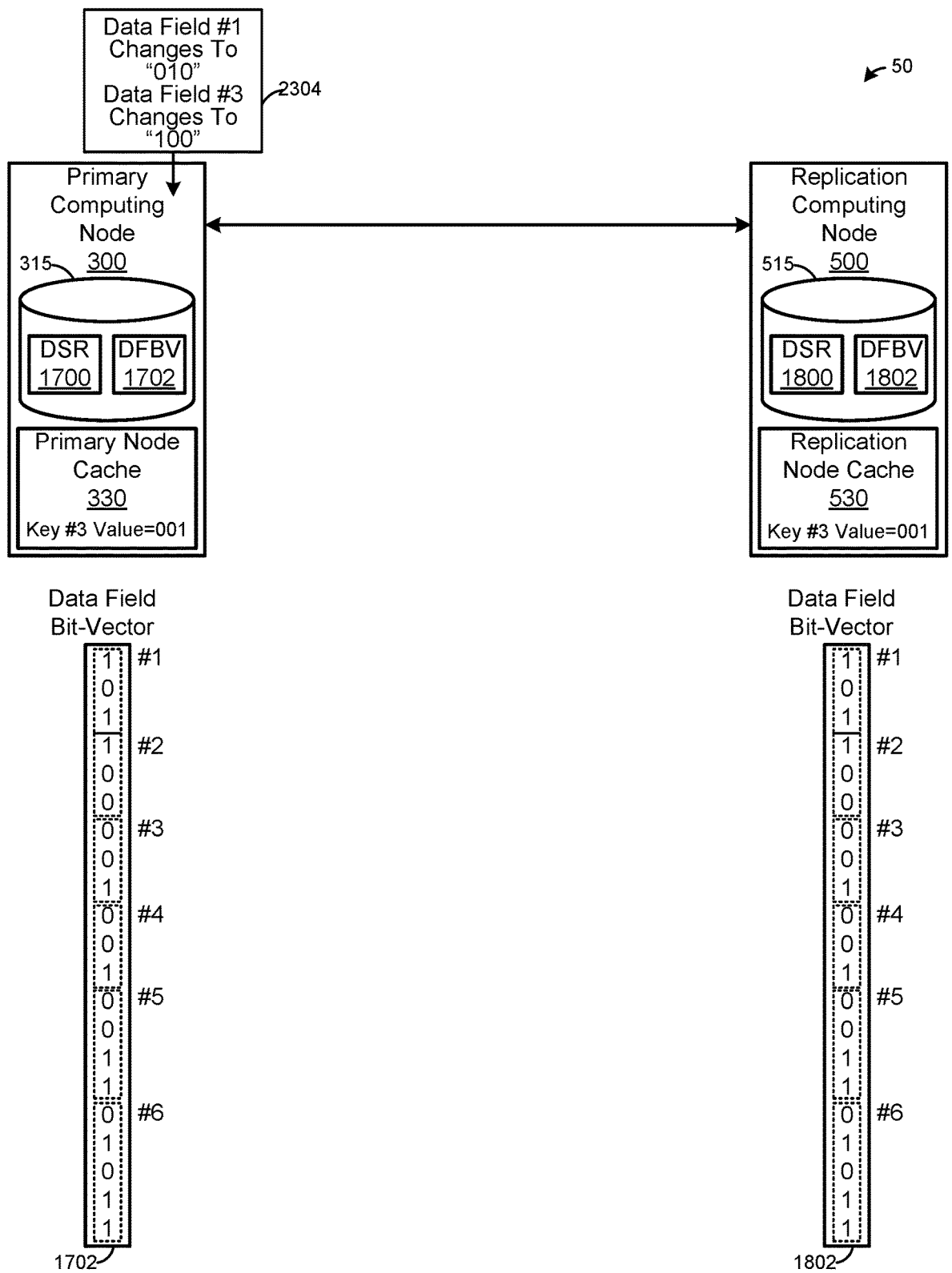

FIG. 23 depicts a portion of the system of FIG. 1 adapted to include a cache at the primary computing node, and an optional cache at the replication computing node, according to non-limiting examples.

Figure 24:
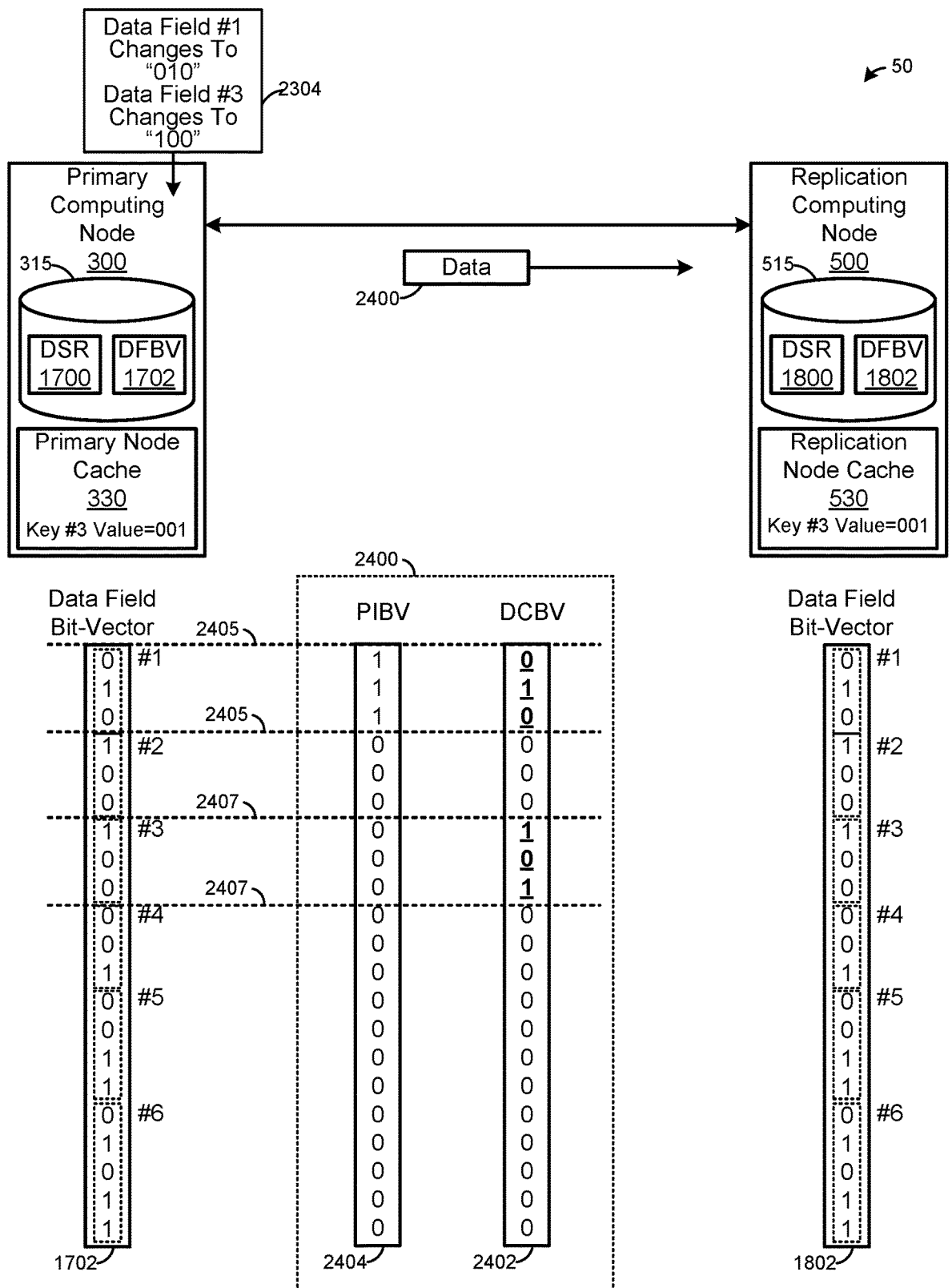

FIG. 24 depicts an example of synchronization data adapted according to the optional caches, according to non-limiting examples.

Figure 25:
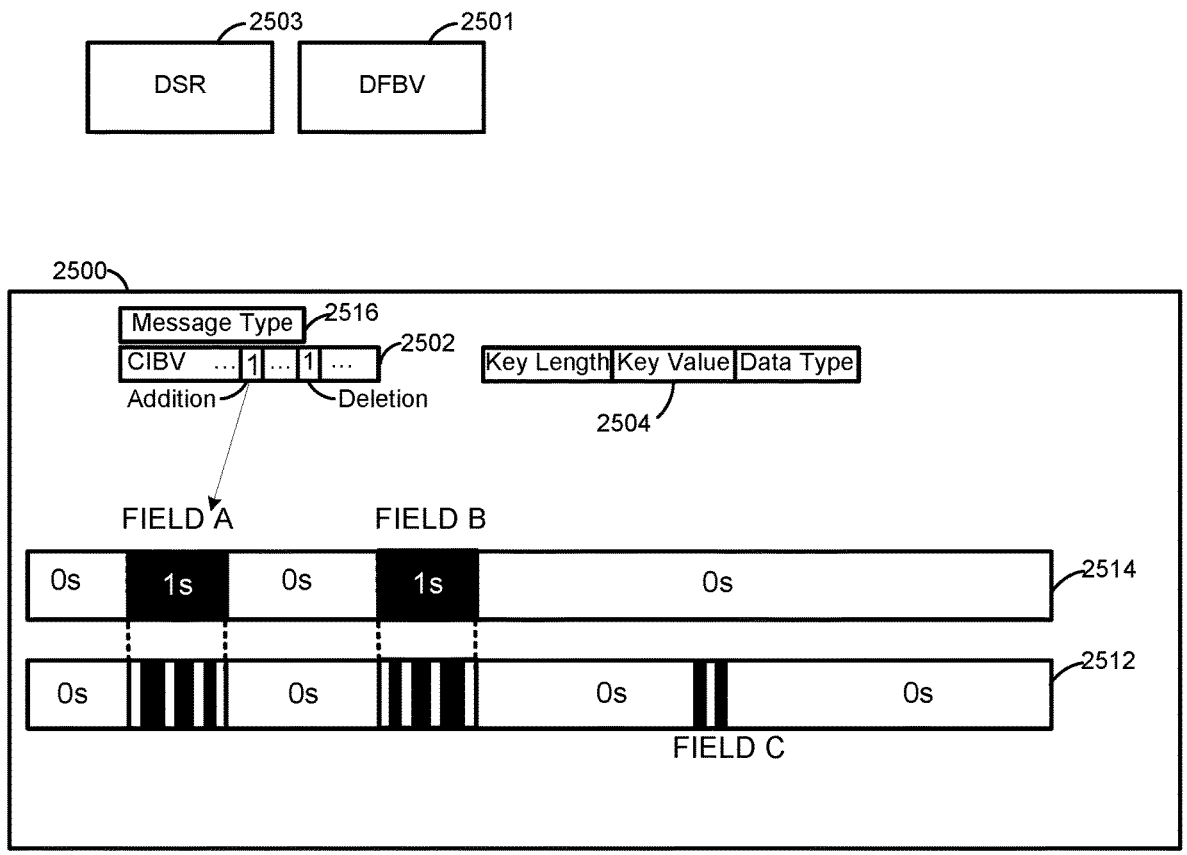

FIG. 25 depicts an example of synchronization data that combines a change indication bit-vector, data change bit-vector, and a position indication bit-vector, according to non-limiting examples.

DETAILED DESCRIPTION

Presently, data may be stored at a first database and replicated at a second database, or vice versa. For databases with large datasets and frequent changes to the datasets, such as changes to fields at the datasets and/or deletion of fields at the datasets and/or addition of fields at the datasets, synchronizing such changes and/or deletions and/or additions may lead to large bandwidth usage, which generally wastes network resources and/or processing resources.

In particular, the distribution of services/applications through a cloud computing platform has become mainstream. The main advantage of cloud computing is that it abstracts most of the concerns relating to the physical hardware and/or software resources, thus enabling users to concentrate on their core business instead of focusing on the maintenance and deployment of data centers. The cloud computing model is based on providing a user with access to physical computing resources on a pay-as-you-go basis, whereby the user pays for the computing resources allocated to one or more application servers to run the required services/applications on the cloud computing platform. As the demand for the cloud operated services/applications changes, the underline physical resources can be dynamically scaled to meet the computing needs of the cloud services/applications at any given time.

A cloud computing platform is generally distributed among a plurality of computing nodes, e.g. data centers. Each computing node may be configured for running at least part of a service and/or application requested by a client, which may involve the manipulation of large amounts of data, e.g. sorting, joining, combining, and the like to generate a response to a client query. For many cloud applications, the manipulation of data may need to be performed at each computing node to generate fast response to the client query. Performing the manipulation of data at each computing node may necessitate the use of fresh data, which is data reflecting the latest changes, in order to ensure that the response forwarded to the client reflects the latest data updates. For example, when calculating the availability of flights in response to a client travel search query, it is important that the data pertaining to the calculation has been updated with the latest changes, thus ensuring the accuracy of the results forwarded to the client.

The current approaches for maintain freshness of data in a distributed architecture vary widely. A well-known method for maintaining freshness and consistency of data is the force approach, which involves taking a snapshot of the entire data-set to be replicated, dividing in into blocks, and transmitting for replication to the different replication nodes. However, such an approach involves the complete replication of the data-set, which would increase the amount of data transmitted over the network and the latency in replicating the data to the corresponding replication nodes. Therefore, an optimization for periodic updates consists in detecting which blocks have changed and only transmitting these.

Another approach for replicating data between nodes is known as the multiple-primary database replication, which leverages the database change event log to identify and transmit data changes between computing nodes in a distributed architecture. Each change detected is streamed as a message to the other computing nodes for replication. However, the transmitted message has a large overhead as it contains, in addition to the databases change, the key of the changed item, as well as the format (type) of the information transmitted, so that the receiving computing node can process each individual change, leading to a poor network transmission efficiency.

Another approach for replicating data is known as the INTRA-datacenter latency optimized approaches involving a serialization scheme such as Google™ protocol-buffer. These schemes aim at transmitting possibly extremely large arrays (terabyte big data) of exactly identical data structures (all packets have the same format) across processes and machines INTRA-datacenter. However, these serialization schemes are less flexible when it comes to data-sets containing data fields of different data size.

Therefore, there is generally a technical need for replicating data to different computing nodes, that is flexible in relation to the data format and size of the data to be replicated, and network efficient in terms of transmission cost and latency.

Hence, provided herein is a system that includes a first computing node that maintains a first database, and a second computing node that maintains a second database. When changes are made to one of the databases, the respective computing mode may act as a primary computing node that synchronizes changes at the respective database with changes to the other database, with the respective computing node of the other database acting as a replication computing node. In general, the computing nodes maintain, for a given data set, a data-set representation (DSR) structure that defines data field positions of the given data set, for example in form of respective keys that, in turn define types and/or sizes and/or names of the data fields. The given data sets may be maintained in the form of data field bit-vectors. Another bit-vector structure, which may be referred to as a change indication bit-vector, or CIBV, may be used to identify data fields of the DSR structure, for example, as one bit per data field and corresponding key. The CIBV may be used to efficiently indicate where deletions or additions have occurred in the given data set. For example, when there are N number of data fields defined by the DSR structure, a corresponding CIBV may comprise N bits, with a first bit associated with a first data field of the DSR structure (e.g. and the data field bit-vector) and a corresponding first key, a second bit associated with a second data field of the DSR structure (e.g. and the data field bit-vector) and a corresponding second key, etc. Indeed, as the CIBV indicates positions of additions or deletions of keys and data fields, the CIBV may alternatively be referred to as a key change bit-vector. Regardless, a bit of the CIBV may be used to indicate where an addition or deletion has occurred at the given data set and where a corresponding key has been added or deleted at the DSR; in general, when a key is added or deleted in the DSR structure, a corresponding data field is added or deleted at the stored data-set.

Furthermore, it is understood that when a key is deleted from a DSR structure, the position of the deleted key may be maintained at the DSR structure, but be made available for new key, using a placeholder identifier at the DSR structure such as <EMPTY>. Similarly, when a corresponding data field is deleted from the given data set, bits of the corresponding data field aren't removed from the given data set; rather, the bits are set to a default value, such as "0" and are understood not to be in use by virtue of the corresponding key of the DSR structure being deleted.

In some examples, when an $n^{th}$ data field, and corresponding key, has been deleted from the given data set and the DSR structure, the $n^{th}$ bit of the CIBV may be set to "1" by the primary computing node, while the remainder of the bits of the CIBV may be set to "0". Similarly, when a data field and corresponding key is added to the given data set and the DSR structure, for example at the end of the given data set and the DSR structure, an N+1 bit of a value "1" may be added to the end of the CIBV, while the remainder of the bits of the CIBV may be set to "0". Similarly, when a data field is added to the DSR structure and the given data set anywhere other than at their respective ends, for example at the beginning and/or in the middle of the given data set and the DSR structure, for example at an $n^{th}$ position corresponding to an available and/or empty key position, the $n^{th}$ bit of the CIBV may be set to "1" by the primary computing node, while the remainder of the bits of the CIBV may be set to "0". The primary computing node transmits an indication of the CIBV, the indication generated using any suitable scheme, and provides the indication to the replication computing node, which generally informs the replication computing node of the position of the change so that the replication computing node may implement the change at a respective given data set at the respective database including, but not limited to, updating a respective DSR structure to add or delete a key accordingly and updating a respective stored data set to add or delete a data field, accordingly; when a new key is added to an available and/or empty key position and a corresponding new data field is "added" at a position of a previously deleted data field, it is understood that bits of the previously deleted data field are now available to store values of the new data field.

Indeed, in general, it is understood that while keys and data fields may be inserted between existing keys and existing data fields, such an insertion generally involves reindexing the existing keys and the existing data fields which generally adds overhead to processing at the primary computing node and the replication computing node. As such, while such insertions are not precluded by the present specification, additions may more generally occur at ends of a stored data set and a DSR, and/or at existing available, unused data field positions and unused key positions. Nonetheless it is understood that the present specification, when the change comprises an addition, includes insertion of a new key and a new data field respectively between existing keys and existing data fields.

When the change comprises an addition, the indication of the CIBV that is provided to the replication computing node may depend on whether the addition is at the end of the given data set and the DSR structure or within the given data set and the DSR structure. For example, when the addition is within the given data set and the DSR structure (e.g. not at the ends), the indication of the CIBV may comprise a compressed version of the CIBV along with a record of a key value of the new data field and a data value of the new data field (and optionally a key value length and/or a data type of the new data field). However, when the addition is at the end of the given data set, the record, itself may act as the indication of the CIBV, as receipt of the record at the replication computing node, without the CIBV, may inherently instruct the replication computing node to add the data field to the end of the respective given data set.

Similarly, bit-vector structures may be used by the primary computing node to indicate where changes have occurred to existing data fields in a given data set, represented by a data field bit-vector. For example, a change at the data field bit-vector may be represented by a data change bit-vector, for example having a same length as the data field bit-vector, with a group of bits in the data change bit-vector indicating values (e.g. absolute values) of a respective changed data field of the data field bit-vector. Other bits in the data change bit-vector may be placeholder bits of a given binary value, such as "0".

Another vector may be generated, which may be referred to as a position indication bit-vector, and/or a mask vector, which indicates the one or more positions of the changed data value at the data change bit-vector. For example, the position indication bit-vector may be of a same length as the data change bit-vector, and may comprise a given binary value, such as "1", at positions corresponding to the one or more positions of the changed data value at the data change bit-vector, with another binary value, such as "0", at other positions. Hence, the position indication bit-vector acts as a kind of mask indicating where changes are indicated at the data change bit-vector.

However, the position indication bit-vector may have other formats. For example, rather than including a given binary value at positions corresponding to the one or more positions of the changed data value at the data change bit-vector, such a given binary value, such as "1", may be at positions of the position indication bit-vector corresponding to a first and last position of the changed data value at the data change bit-vector, with another binary value, such as "0", at other positions.

In yet other examples, the replication computing node may have access to indications of data field lengths of the data field bit-vector, for example in the form a replicated DSR. In these examples, rather than including a given binary value at positions of the position indication bit-vector corresponding to the one or more positions of the changed data value at the data change bit-vector, the position indication bit-vector may comprises bits of a same number as the data change bit-vector, a subset of the bits the position indication bit-vector, that are at same respective positions of the changed data value of the data change bit-vector, being of a different given binary value, such as "1" than other bits of the position indication bit-vector which have another binary value, such as "0. Hence, in these examples, the position indication bit-vector may comprise one bit per key of the DSR.

Regardless of format of the data change bit-vector, the primary computing node transmits indications of the data change bit-vector and the position indication bit-vector to the replication computing node, for example as synchronization data. Such indications may comprise the data change bit-vector and the position indication bit-vector in a compressed format. The replication computing node processes the indications of the data change bit-vector and the position indication bit-vector to update a respective stored data-set.

Furthermore, in some examples, the primary computing node may determine where changes have occurred to the given data set by maintaining a cache of previously changed data values and corresponding keys, so that changes to values of data fields may be quickly determined. In particular, when a change occurs to a data field in the primary database, the previous value may be overwritten; a cache generally enables the primary computing node to determine positions of the bits of a data field that have changed by comparing the changed value in the primary database with a correspond previous value in the cache. However, so as to prevent the cache from bloating, in some examples, the cache may comprise previously changed data values of data fields of the primary database, for example stored only for a given time period, such that when another change occurs to a data field of the primary database, the previous value may be retrieved from the cache within the given time period.

In some examples, a respective cache may be maintained at the replication computing node, such that the replication node may also quickly determine positions of bits of a data field that have changed by comparing a changed value, received from the primary database, with a corresponding existing value in the respective cache (e.g. rather than retrieving a respective stored data-set and/or data field bit-vector from the replication node cache).

Attention is directed to FIG. 1 which depicts a distributed storage system 50 for synchronizing changes, deletions or additions to fields at databases. The distributed storage system 50 will be interchangeably referred to hereafter as the system 50.

The components of the system 50 are generally in communication via communication links which are depicted in FIG. 1, and throughout the present specification, as double-ended arrows between respective components. The communication links includes any suitable combination of wireless and/or wired communication networks and, similarly, the communication links may include any suitable combination of wireless and/or wired links.

The system 50 will furthermore be described with respect to engines. As used herein, the term "engine" refers to hardware (e.g., a processor, such as a central processing unit (CPU), graphics processing unit (GPU), an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), a PAL (programmable array logic), a PLA (programmable logic array), a PLD (programmable logic device), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

As depicted, the system 50 comprises a primary computing node 300 configured to handle and store data received from a plurality of data sources 100 over a first communication network 200. The primary computing node 300 may be implemented by any suitable number of computer servers of a first data center. Each data source 100 may be configured to communicate to the primary computing node 300 a specific type of data structured in a predetermined data format. For example, each data source 100 may represent a different airline system, each communicating to the primary computing node 300 at least one data-set containing information relating to the airline's flight schedule, availability, routes, aircraft types, airports, affiliate airline network, and other similar information. The data-sets communicated by each data source 100 may be valid only for a specific period of type, and thus may contain an expiration time limit. The primary computing node 300 may be configured to communicate the data-sets received from the data sources 100 to replication computing nodes 500 over a second communication network 400, where the data-sets are processed and stored. Each replication computing node 500 may be implemented by any suitable number of computer servers of a data center, which may be located at a different geographical location from the primary computing node 300 and the other replication computing nodes 500. For example, the primary computing node 300 may be implemented in a data center located in Europe, one of the replication computing nodes 500 may be implemented in a data center located in North America, while another replication computing node 500 may be implemented in a data center located in Asia. The data stored at each replication computing node 500 may be accessed by a plurality of customers. The location of each replication computing node 500 may be decided according to how fast customers can access the relevant data. For example, for a Travel Agent located in North America, it would be faster to access data that is stored in a replication computer node 500 located in the same geographical region, compared to accessing data that is stored at a replication computing node 500 located in Europe or Asia. Therefore, it is important that the data stored in each replication computer node 500 is refreshed regularly to accurately reflect the latest data updates received at the primary computing node 300 from the different data sources 100. For example, in the travel industry, it is important that the seat availability of a specific flight is accurately reflected on all replication computing nodes 500. Otherwise, there is a risk incorrect seat availability for a flight might be provided to Travel Agents (and the like) in a region of a replication node 500 using data stored in the replication node 500 to book seats. Currently, the main approach of maintaining the freshness and consistency of data, between data-sets stored in a primary computing node 300 and a corresponding data-sets stored in a replication computing node 500, is to periodically transmit for the replication the entire data-sets from the primary computing node 300 to all replication computing nodes 500. Although the existing approach ensures the freshness and consistency of data across different computing nodes, it has a high associated network communication cost, due to the large amount of data that needs to be transmitted over the network. However, when updating stored data-sets, it is not always necessary to transmit the entire updated data-sets to the replication computing nodes. In most cases, each data-set would contain data fields storing data values that are highly volatile and are bound to change at a faster rate compared to the data values stored in other data fields of the same data-set. Therefore, in most cases, it is sufficient to transmit only the data values of the data-sets that have changed compared to previous versions, and only transmit the entire updated data-sets when there is a fundamental difference, e.g. in the data structure, data types, and the like. By transmitting the data values that have been changed rather than entire updated data-sets has been shown to dramatically reduce the communication bandwidth requirements for maintaining the freshness and consistency of data stored across different computing nodes over time. As a result, due to the reduction in the communication bandwidth requirements, there would be an associated reduction in the network communication cost. This is achieved by providing various engines for maintaining consistency across the primary computing node 300 and the replication nodes 500, and associated methods for maintaining consistency of data across different computing nodes 300, 500, such as associated methods for synchronizing changes, deletions or additions to fields at databases maintained by the different computing nodes 300, 500.

Furthermore, while examples herein are described with respect to changes occurring at a database maintained by the primary computing node 300, and synchronization of such changes at respective databases maintained by the replication computing nodes 500, in other examples changes to respective databases maintained by the replication computing nodes 500 may occur and such changes may be synchronized with respective databases maintained by the primary computing node 300 and the other replication computing nodes 500. Put another way, depending on where a change to a database occurs, a replication computing node 500 may act as a primary computing node and the primary computing node 300 may act as a replication computing node. Hence, the term "primary computing node" is understood herein to refer to a computing node maintaining a database where a change to a data field occurs that is to be synchronized with databases maintained by other computing nodes. Similarly, the term "replication computing node" is understood herein to refer to a computing node maintaining a database that is to be synchronized with a database, maintained by another computing node (e.g. a primary computing node), at which a change to a data field occurs.

Figure 2:
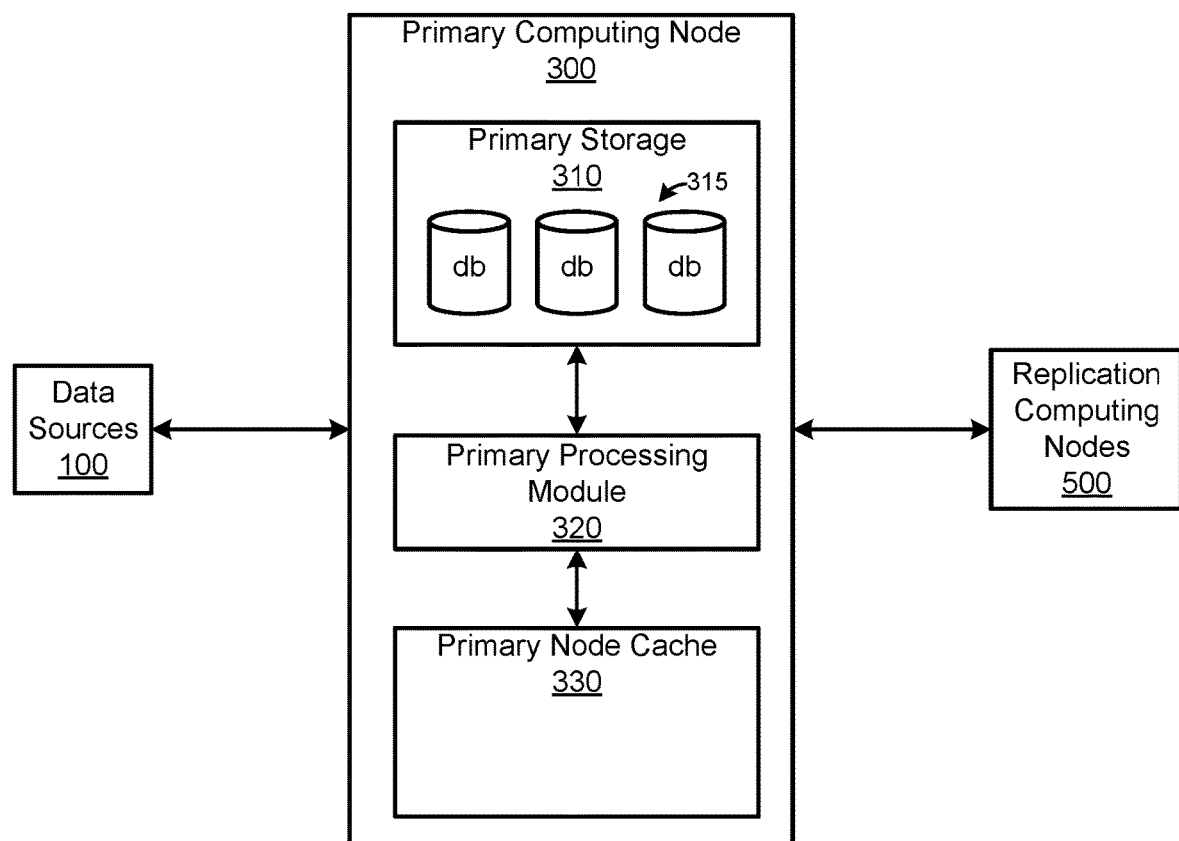
FIG. 2 depicts a primary computing node, according to non-limiting examples.

FIG. 2 shows an example of a primary computing node 300, in communication with the data sources 100 and the replication computing nodes 500. As depicted, the primary computing node 300 is provided with primary storage 310 for storing the data-sets received from the different data sources 100 on a number of primary databases 315, along with their corresponding Data Set Representation (DSR) structure, which defines for each data-set the layout and/or structure of their representative data fields. The primary computing node 300 may be provided with a primary processing module 320, which is configured for processing each updated data-set received from the different data sources 100 to determine changes made to the data values and structure of the data fields of the primary databases 315, compared to corresponding previous versions of each data-set stored in the primary storage 310, which are communicated to the at least one replication computing node 500 for synchronization and/or replication. The primary processing module 320 updates the stored data-sets with the corresponding data updates.

As depicted, the primary computing node 300 may optionally maintain a primary node cache 330 of previously changed data fields (not depicted) of the primary storage 310, and which may be updated to store values of changed data fields, for example as a data fields at the primary storage changes. Hence, when a same data field of the primary storage 310 again changes, a previous value of the data field stored at the primary node cache 330 may be available to the primary computing node 300 such that the primary computing node 300 may determine a difference between the present value of the data field and a previous (e.g. last) value of the data field. Use of the primary node cache 330 is described herein with respect to FIG. 24 to FIG. 25.

Figure 3:
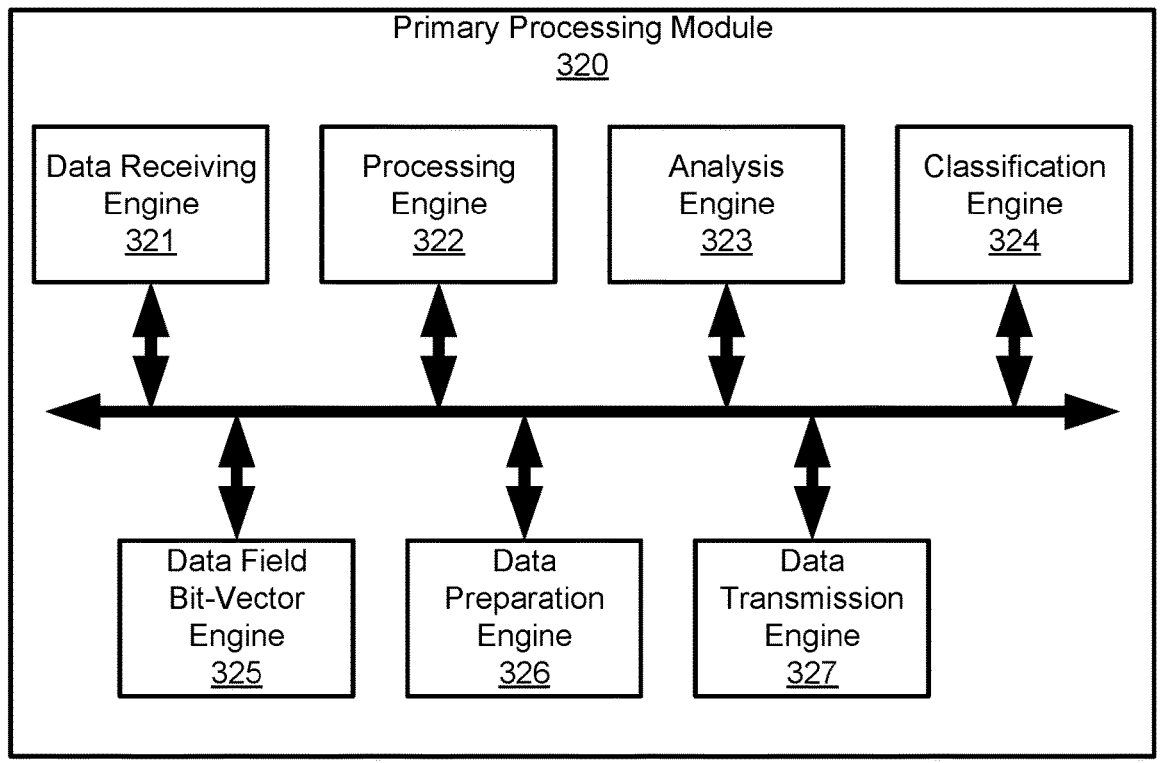
FIG. 3 depicts a primary processing module, according to non-limiting examples.

FIG. 3 shows an exemplified architecture for the primary processing module 320 which is depicted as comprising a plurality of engines which implement respective functionality as described herein. While a particular structure, and particular engines, of the primary processing module 320 is depicted, it is understood that functionality of the engines may be combined, or further distributed amongst more engines, such that the primary processing module 320 includes fewer or more engines than depicted. Indeed, together, the engines of the primary processing module 320 may comprise a synchronization engine which generally synchronizes changes to the databases of the primary storage 310 with respective databases of the replication computing nodes 500, as described herein.

As shown, a data receiving engine 321 may be provided to receive updated data-sets from the different data sources 100 and for identifying the corresponding stored data-set in the primary databases 315. Each updated data-set may be forwarded to a processing engine 322, where it is processed to generate its updated Data Set Representation (DSR) structure. An updated DSR structure may be analyzed by an analyzing engine 323 to extract the data fields of the corresponding updated data-set version. The extracted data fields may be classified by means of a classification engine 324 into stable data fields, comprising data values that change at a first frequency rate, and volatile data fields, comprising data values that change at a second frequency rate, which is higher than the first frequency rate. The classification engine 324 may use a range of data processing techniques (e.g. Machine Learning, combined with historical data, and the like) to determine a rate at which the data values of each data field in the data-set changes over time and accordingly classify the data fields into volatile or stable data fields. Once the data fields have been classified, a data field bit-vector engine 325 may extract the data values from the volatile data fields of each updated data-set and accordingly generate a corresponding data field bit-vector (described in more detail below with respect to FIG. 7 and FIG. 8) storing the extracted volatile data values.

For each data-set, the data field bit-vector may be generated by concatenating the data values of the volatile data fields of the updated data-set. In the data field bit-vector, the data bits representing the data values of each volatile data field are stored serially, i.e. one data bit after another. The data values may be ordered in the data field bit-vector according to the order in which the volatile data fields are presented in the DSR structure corresponding to each processed, updated data-set. The generated data field bit-vector may be stored together with the corresponding updated data-set in a primary database 315 of the primary storage 310. The generated data field bit-vector may be encoded as a difference from a data field bit-vector generated for a previous version of the corresponding data-set. Once the data field bit-vector has been created for an updated data-set, a data preparation engine 326 may be used to prepare the data to be synchronized and/or replicated at the least one replication computing node 500. In particular, the data preparation engine 326 may operate in different modes depending on types of changes that have occurred to a data set, such as adding a data field, deleting a data field, or changing a data field. A mode of the data preparation engine 326 may further depend on whether, or not, a previously changed data value for the data set (e.g. and a corresponding key) is stored at the primary node cache 330. Regardless, the data preparation engine 326 is understood to generate replication and/or synchronization data which may be provided (e.g. transmitted) to a replication computing node 500 to cause the replication computing node 500 to synchronize a respective data set at a respective replica database with a primary database 315 at which the data set is stored.

In some examples where a change to a data set of a primary database 315 has not yet occurred, the synchronization data may contain at least the generated data field bit-vector along with other information. The data field bit-vector engine 325 may be configured to compare the generated DSR structure of the updated data-set with the DSR structure of the corresponding data-set stored in a primary database 315 to identify differences in the data structure. In the case, where differences are detected in the data structure, e.g. addition or deletion of data fields, then, in one mode, the data preparation engine 326 may include in the synchronization data, in addition to the data field bit-vector, the updated DSR structure and/or the entire updated data-set, for replication to the at least one replication computing node. The previous version of the data field bit-vector may be stored in the primary storage 310 together with the corresponding previous version of the data set and/or DSR structure. Once the synchronization data is ready, a data transmission engine 327 may transmit, via a second communication network 400, the synchronization data to the at least one replication computing node 500.

In some examples, the synchronization data may be compressed by means of a compression engine, which may be part of the data transmission engine 327, before it is transmitted to the at least one replication computing node 500, where it is decompressed by a decompression engine of a respective data receiving engine, of the at least one replication computing node 500. Any suitable data compression algorithm may be used for the compression of the synchronization data. For example, a run-length encoding (RLE) compression algorithm and/or engine may be used, which is configured to encode a sequence of identical bits in the data field bit-vector as a number representing the length of the sequence. In some examples, a predetermined symbol generated by the RLE algorithm may be used to denote a bit that may be skipped or that it has not changed. The use of symbols and the number representation of the length of the bit sequence in the data field bit-vector may increase the efficiency of the compression algorithm. Other compression algorithms and/or engines such as Bzip2, Gzip, ZLIB, in-band and out-of-band dictionary compression algorithms and/or engines may be used to compress the data field bit-vector. Classical compression algorithms and/or engines (e.g. gzip, bzip2) work by building a dictionary of the most common sub-strings in a compressed file and then encoding each with the minimum number of bits. The data dictionary may be provided inside the compressed file; thus, when travelling on the network, the data dictionary is referred to as "in-band".

On the other hand, out-of-band dictionary compression may be implemented which consists of: processing a lot of reference data to extract the (statistically best) data dictionary; and freezing the dictionary (with an ID/date) and send it to all parties (encoders and decoders) "once and for all" (or at least, do not change it too often . . . ). This saves the network bandwidth of sending the dictionary with each data files. Some examples of out-of-band include Zstandard, and RFC 3284 specifies VCDIFF, a compression format (for HTTP transactions) that uses a default "code table" but allows usage of application-specific code tables. However, it is understood that any suitable combination of compression algorithms may be used for the compression of the synchronization data and which may include different compression algorithms used to compress different sections of the synchronization data, and the like.

However, in modes where the data preparation engine 326 generates synchronization data that comprises the data field bit-vector, which is transmitted to a replication engine, transmitting the entire data field bit-vector may lead to high consumption of bandwidth. Hence, described below with respect to FIG. 10 to FIG. 15 are other modes of the data preparation engine 326 which may be used to further reduce a size of the synchronization data.

Figure 4:
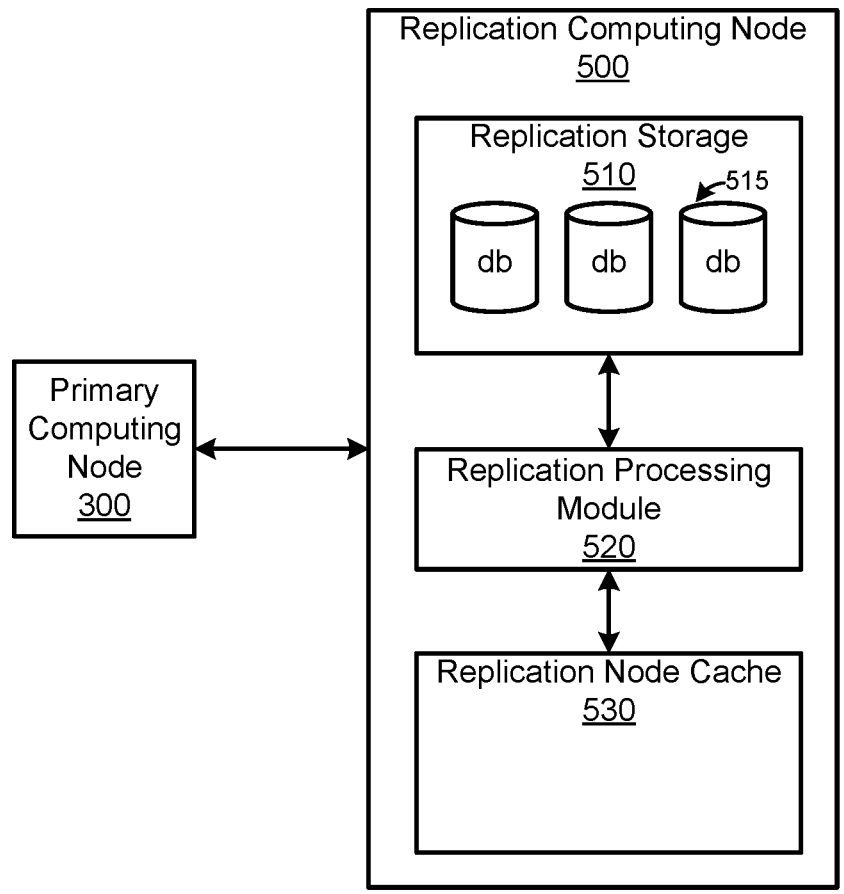
FIG. 4 depicts a replication computing node, according to non-limiting examples.

Attention is next directed to FIG. 4, which shows an example of a replication computing node 500, in communication with the primary computing node 300. Each replication computing node 500 may be provided with a replication storage 510 for storing, for example in replica databases 515, the synchronization data-sets and associated DSR structures corresponding to the data-sets and associated information stored in the primary databases 315 of the primary storage 310. Hence, the replication storage 510 may be configured to store substantially the same information as stored in the primary storage 310. The replication computing node 500 is further provided with a replication processing module 520 configured to receive and replicate the synchronization data in the replication storage 510.

As depicted, the replication computing node 500 may be optionally provided with a replication node cache 530 which may be used in a similar manner as the primary node cache 330 of the primary computing node 300. Use of the replication node cache 530 is described herein with respect to FIG. 24 to FIG. 25.

Figure 5:
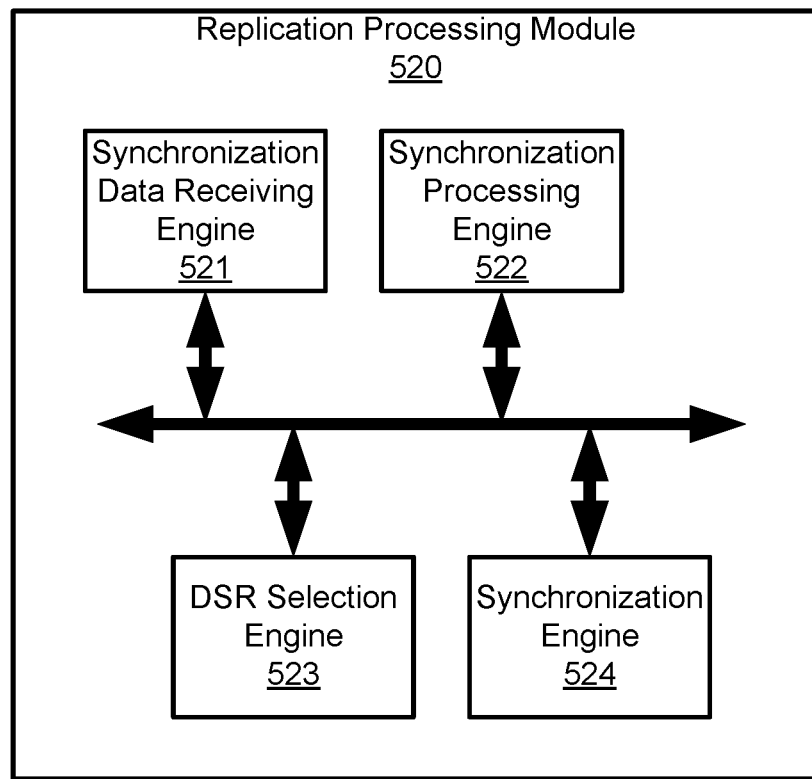
FIG. 5 depicts a replication module, according to non-limiting examples.

FIG. 5 shows an exemplified architecture for the replication processing module 520. While a particular structure, and particular engines, of the replication processing module 520 is depicted, it is understood that functionality of the engines may be combined, or further distributed amongst more engines, such that the primary processing module 320 includes fewer or more engines than depicted. Indeed, together, the engines of the replication processing module 520 may comprise a synchronization engine which generally synchronizes the replica databases 515 with changes to the databases of the primary storage 310, as described herein.

The replication processing module 520 is provided with a synchronization data receiving engine 521 configured to receive the synchronization data from the primary computing node 300. The synchronization data receiving engine 521 may also identify the synchronization data-set in a replica database 515 of the replication storage 510 corresponding to the synchronization data received. A synchronization processing engine 522 may be operated in different modes for processing the synchronization data to extract the data values to be synchronized and/or replicated, depending on types of synchronization data received. For example, when the synchronization data comprises a data field bit-vector, the synchronization processing engine 522 may extract the data values to be synchronized and/or replicated from the data field bit-vector. Other modes will be described in more detail below, which may correspond to modes of the data preparation engine 326.

A DSR selection engine 523 is provided to select a synchronization DSR structure (e.g. corresponding to the DSR structure at the primary computing node 300 used to generate the synchronization data) to be used in the mapping of the extracted data values to the data fields of the corresponding synchronization data-set. The DSR selection engine 523 is configured to determine whether the synchronization data comprises and/or indicates an updated DSR structure. In modes where an updated DSR structure is transmitted together with the synchronization data (e.g., when the structure of the stored DSR has changed or expired), then the updated DSR structure is selected as the synchronization DSR structure, otherwise the DSR structure of the corresponding stored synchronization data set is selected as the synchronization DSR structure. Once the corresponding replication DSR has been selected, a synchronization engine 524 is provided to replicate the extracted data values of the synchronization data in the corresponding synchronization data-set.

As with the data preparation engine 326, the synchronization processing engine 522 and/or the synchronization engine 524 may operate in different modes depending on types of synchronization data received as described below with respect to FIG. 10 to FIG. 25.

Figure 6:
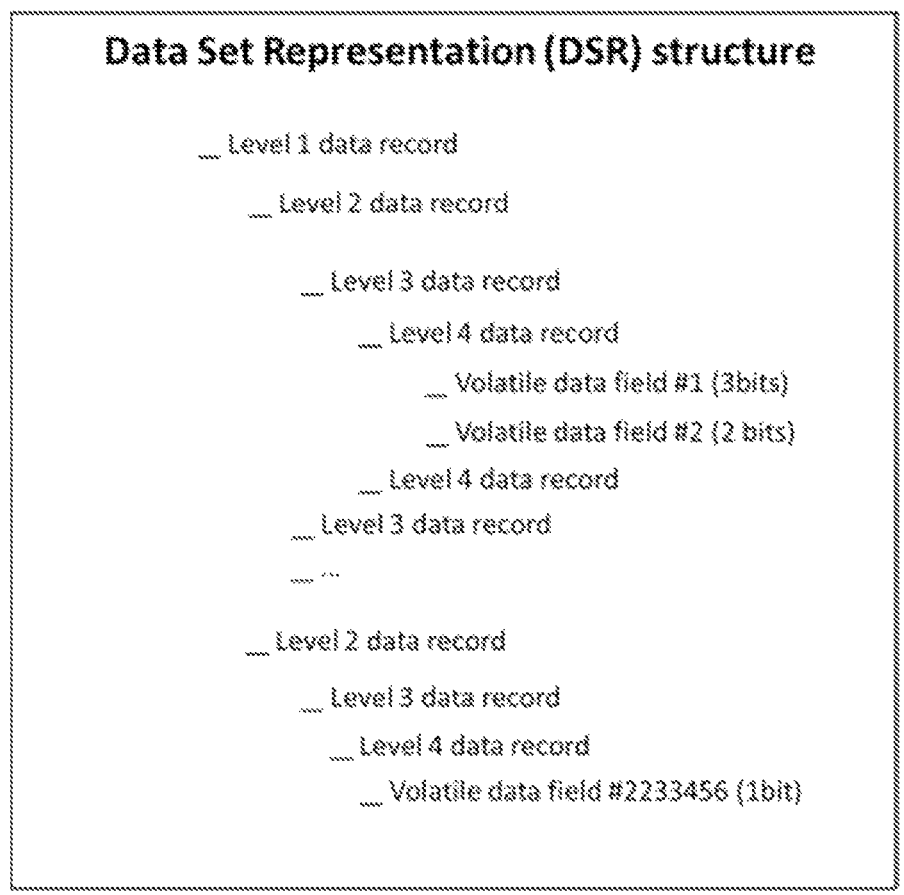
FIG. 6 depicts a Data Set Representation (DSR) structure, according to non-limiting examples.

FIG. 6 shows an example of a DSR structure 600 generated from a data set received from a data source 100. As shown the DSR structure 600 may identify the different level data records, the type of data fields, e.g. volatile or stable, the size of the data values stored in at least the volatile data fields, e.g. expressed by the number of bits, and other relevant information.

For example, in the context of the travel industry, the data-set used to generate the DSR structure 600 may represent the different travel recommendations received in response to a query from an airline. In this example, a Level 1 data record of the DSR structure 600 may represent a travel recommendation, a Level 2 data record may represent a proposed travel solution, and a Level 3 data record may represent different flight route options for the proposed travel solution. While "stable" data fields for data records of Levels 1-3 are not depicted, they are nonetheless understood to be present, but are not expected to change (or at least they are expected to change at a rate that is slower relative to volatile data fields). Indeed, a Level 4 data record may represent volatile data fields that may represent the seat availability. Values representing seat availability in this example, are expected to change faster than values of the stable data fields, as more customers book the proposed travel solution, as compared to the flight route options, which are determined well advanced. As depicted, there are 2233456 volatile fields indicated by the DSR structure 600, though only volatile fields #1, #2 and #2233456 are depicted. From such an example, it is understood that a number of volatile fields may be large and subject to change.

In another example, the data-set used to generate the DSR structure 600 may represent a status of bookings of an airplane for a given flight, and may identify a field used to indicate a flight number for the given flight, a type of an airplane for the given flight, a field used to indicate a number of cabin types for the given flight, and fields used to indicate status of seats for the given flight. In this example, a Level 1 data record DSR structure 600 may represent the flight number, a Level 2 data record may represent a given type of an airplane for the given flight, a Level 3 data record may represent the given number of cabins, and a Level 4 data record may represent volatile data fields that may represent seat availability for seats of the airplane. Again, values representing seat availability in this example, are expected to change faster than values of the stable data fields, once an airplane is assigned to a given flight, the airplane is not expected to change.

Figure 7:
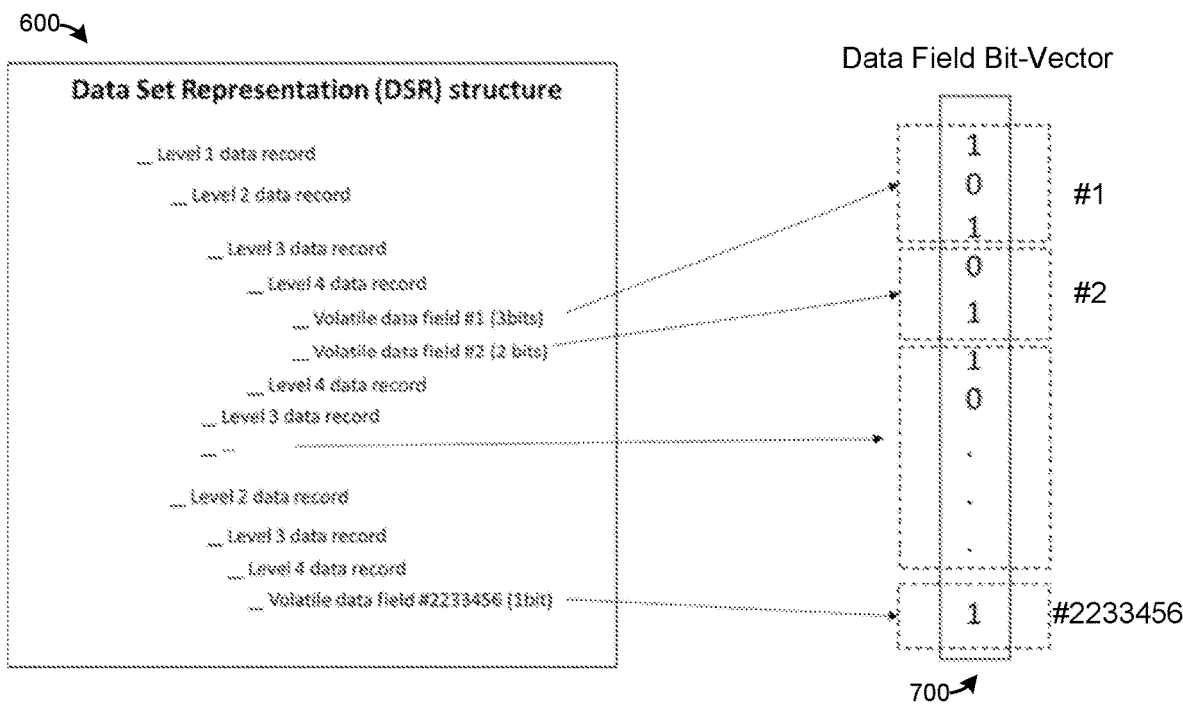
FIG. 7 depicts a data field bit-vector storing data values extracted from the volatile data fields of the DSR structure shown in FIG. 6, according to non-limiting examples.

FIG. 7 shows an example of a generated data field bit-vector 700 based on the DSR structure 600. The data field bit-vector 700, also known as bit array bit map, bit set, or bit string, is an array data structure that compactly stores bits. It can be used to implement a simple set data structure. Indeed, in general, a bit-vector may be effective at exploiting bit-level parallelism in hardware to perform operations quickly. A bit array offers dense storage for "random" bits, that is, where each bit is equally likely to be 0 or 1, and each one is independent. However, most data is not random so it may be possible to store it more compactly. For example, the data of a typical fax image is not random and can be compressed. Run-length encoding is commonly used to compress these long streams. As shown in FIG. 7, the data value of each volatile data field of the DSR structure 600 is represented in the data field bit-vector 700 by the number of bits indicated in the DSR structure 600. For example, volatile data field #1 of the DSR structure 600 is represented by three bits of the data field bit-vector 700 (e.g. the first three bits as indicated by the dashed box around the first three bits of the data field bit-vector 700). Similarly, the volatile data field #2 of the DSR structure 600 is represented by two bits of the data field bit-vector 700 (e.g. the two bits after the first three bits, as indicated by the dashed box around the corresponding two bits of the data field bit-vector 700).

Hence, from this examples, it is understood that the data values are represented in the data field bit-vector 700 in the order identified by the DSR structure 600. Hence the data values of the data field bit-vector 700 are provided in order of volatile data field #1, then volatile data field #2, and last is volatile data field #2233456.

Figure 8:
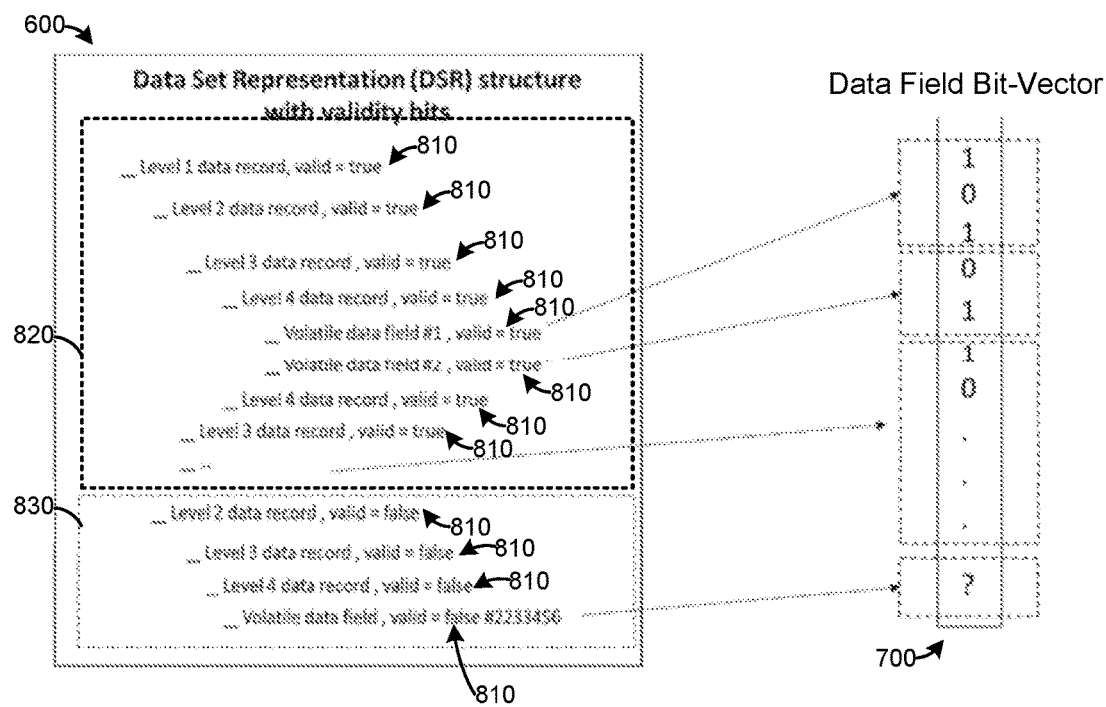
FIG. 8 depicts a DSR structure containing validity bits and their corresponding representation in a data-field bit-vector, according to non-limiting examples.

As shown in FIG. 8, in some examples, the DSR structure 600 may be provided with additional indicators 810, which may be referred to as validity bits, which may be used to indicate changes in a respective the data field bit-vector 700, e.g. addition or deletion (e.g. activation or deactivation) of a data field at the respective data field bit-vector 700. The indicators 810 are understood to be volatile data indicators and may change as a corresponding data field of the respective the data field bit-vector 700 is added or deleted (e.g. activated or deactivated). As depicted, a validity bit may be set to "true" (e.g. and/or "1") or "false" (e.g. and/or "0") as next described.

For example, a DSR structure 600 generated for a corresponding data field bit-vector 700 may comprises at least one place-holder data indicator 810 for accommodating changes in the DSR structure 600, and the place-holder data indicator 810 may comprise a validity bit of "false" if there is no corresponding key for a respective data record indicating that a respective data field of the respective the data field bit-vector 700 is unused.

For example, in a region 820 of the depicted DSR structure 600, all the data indicators 810 have a value of "true", indicating that corresponding data fields of the data field bit-vector 700 are used (e.g. as indicated by the bits having values of "1" or "0").

In contrast, as depicted, in a region 830 of the depicted DSR structure, all the data indicator 810 have a value of "false", indicating that corresponding placeholder data fields of the data field bit-vector 700 are unused, for example, as indicated by a question mark "?"; however, the corresponding unused data fields of the data field bit-vector 700 may be set to a default and/or placeholder value, such as "0" (or "1") as bits of the data field bit-vector 700 are understood to be in a binary format.

Use of the data indicators 810 to assist with adding or deleting (e.g. activating or deactivating data fields) keys and/or data fields is explained in more detail below with respect to FIG. 10 to FIG. 15.

Figure 9:
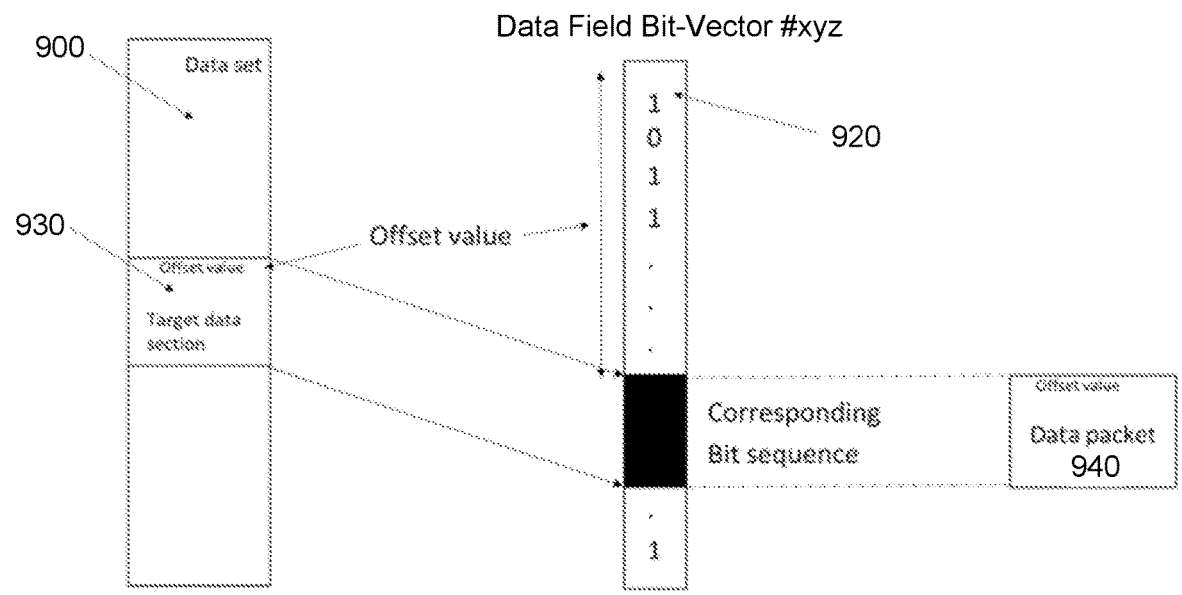
FIG. 9 depicts an example of creating data packets with an offset value from a data-set, according to non-limiting examples.

According to certain examples, a data field bit-vector and/or synchronization data may be divided into data packets, which may be of the same or different data size. For example, attention is next directed to FIG. 9, which shows an example of a data bit-vector data packet 940 of a data field bit-vector 920 (e.g. having an identifier of "#xyz") generated for a corresponding target data section 930 of a data-set 900. Each data packet 940 may be independently transmitted to the at least one replication computing node 500 where all data packets 940 are collected and processed by a data reconstruction engine of the synchronization data receiving engine 521 to reconstruct the synchronization data. By breaking the synchronization data into data packets 940, it becomes possible to transmit the data packets in parallel thus increasing the speed at which the data is transmitted from the primary computing node to the at least one replication computing node. Further breaking the bit-vector and/or the synchronization data into smaller data packets may be necessary, in some cases, to satisfy bandwidth of the transmission communication network. For example, in the case where the size of the bit-vector is larger than the acceptable bandwidth of the communication network. Each data packet 940 may be provided with an offset value, which may be indicative of the number of bits separating the first bit of the volatile data field bit-vector 920 from the first bit of each data packet 940. The offset value of each data packet 940 denotes the order in which the data packets need to be assembled in order to reconstruct the bit-vector and/or the synchronization data.

It is further understood a DSR structure for a data-set may be used as a serialization key at the primary computing node 300 when generating a data field bit-vector and/or synchronization data. For example, with brief reference to FIG. 6 or FIG. 7, a data field is identified by text "Volatile data field #n" (where n=1, 2 . . . 2233456) along with a corresponding length of a data field. However, in other examples, a data field may be identified by any suitable identifiers, and the like, including, but not limited to, natural language text describing a purpose and/or a type of a corresponding data field. However, identification of a corresponding data field in a DSR structure may occur in any suitable manner; such identifiers, and their order, may be used as respective keys mapped to respective data fields. Furthermore, such values may be referred to herein as key values, and may be indexed according to their order; alternatively, the order of the key values may inherently indicate an index.

Similarly, a DSR structure for a data-set may be used as a deserialization key at a replication computing node 500 when synchronizing and/or replicating the data extracted from the synchronization data. For example, a DSR structure at a replication computing node 500 may be used to identify groupings of bits of a data field bit-vector which represent values of the data fields.

Figure 10:
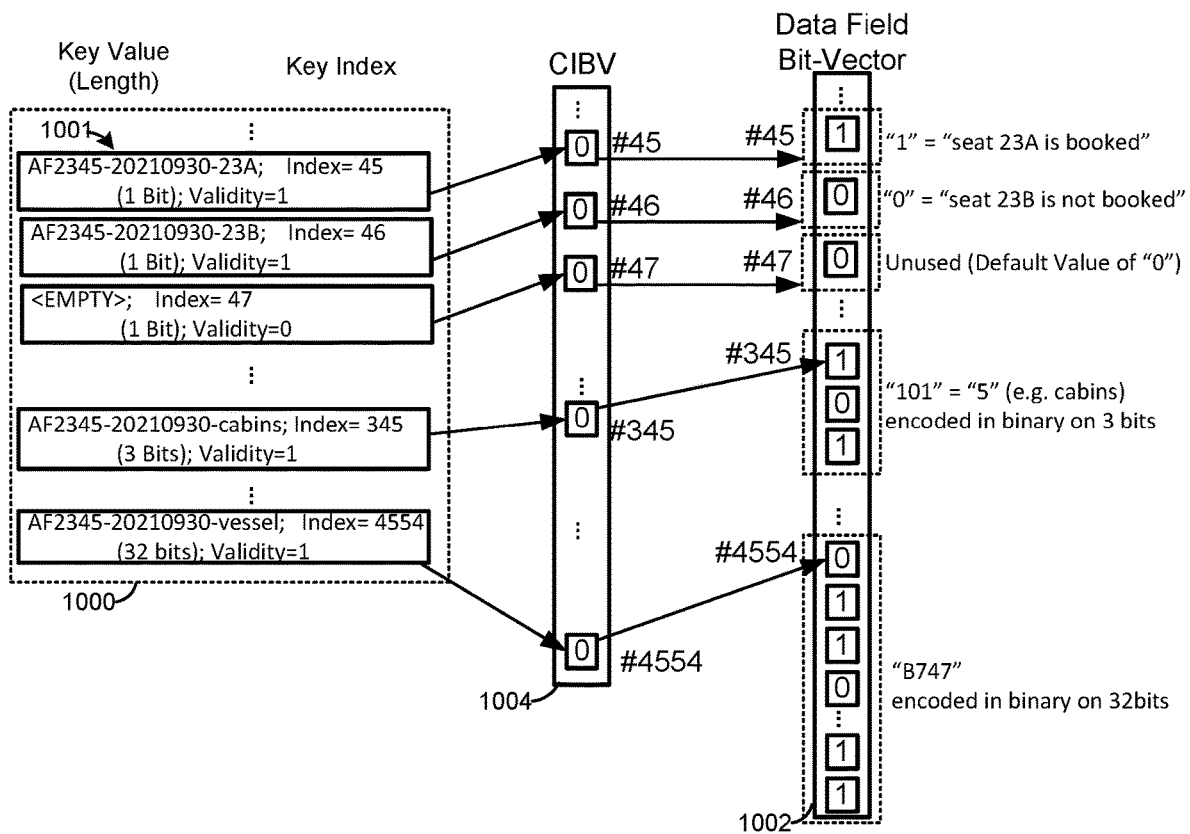
FIG. 10 depicts an example DSR mapped to an example data field bit-vector, and an example bit-vector used to indicate positions changes (e.g. deletions and/or additions) to stored data-set represented by the DSR and the data field bit-vector, according to non-limiting examples.

Attention is next directed to FIG. 10 which depicts another example DSR structure 1000 showing respective keys 1001 for volatile data fields, values for which are provided in a corresponding data field bit-vector 1002. The keys 1001 are shown in a given order at different key positions which are indexed as . . . #45, #46, #47 . . . #345 . . . #4554. While key positions of indices #1 to #44 are not depicted, they are nonetheless understood to be present and may contain keys 1001, or may be placeholders for the addition of new keys. Furthermore, while the DSR structure 1000 is depicted without indicating levels of data records (e.g. Level 1, Level 2, etc.), such indicators of levels may nonetheless be present, similar to the DSR structure 600.

In this example, the DSR structure 1000 and the corresponding data field bit-vector 1002 is to indicate data for a flight having a flight number of "AF2345" on a date of "Sep. 30, 2021" (e.g. "20210930"), such as whether seats are booked or not booked, a number of cabins, and type of airplane that has been assigned to the flight.

For clarity, keys 1001 of the DSR structure 1000 are shown with key values (e.g. indicators which textually indicate and/or describe the function of a corresponding data field of the data field bit-vector 1002) and respective indices of the key positions, which indicate a position of a respective key 1001 in the DSR structure 1000.

Also depicted at the DSR structure 1000 are validity bits for each key position, indicated by the term "Validity" and a corresponding value of "1" (e.g. similar to "True" in FIG. 8) or "0" (e.g. similar to "False" in FIG. 8). As depicted, all the keys 1001 have validity bits of "1"; however at a key position having an index of #47, which is depicted with a placeholder key value of <EMPTY>, it is understood that there is no corresponding key, may have not yet been populated, or may have been previously deleted.

For example, a key 1001 having an index #45 has a key value of "AF2345-20210930-23A" which indicates the flight having a flight number of "AF2345" on a date of "20210930" (e.g., Sep. 30, 2021) and a seat number of "23A". Indeed, each of keys 1001 having indices of #1 to #46 and #48 to #344 may represent respective seats for the flight, though only keys 1001 for seats having indices of #45, #46 are shown. Furthermore, keys 1001 for seats having indices of #45, #46, and a size of a corresponding data field of the data field bit-vector 1002, are depicted, in particular, a size of "1 Bit" each. The corresponding data fields of the data field bit-vector 1002 for the keys 1001 for seats 23A, 23B, having corresponding indices of #45, #46, which are also numbered as #45, #46, are depicted as having values of "1" or "0" indicating that a respective seat is booked ("1") or not booked ("0").

It is further understood that the key position having an index of #47 also includes a size of "1 Bit" indicating that a presently unused data field of the data field bit-vector 1002 having an index of #47 has a size of "1 bit". As depicted, the presently unused data field of the data field bit-vector 1002 having an index of #47 has a default value of "0" but is understood not to be in use (e.g. by virtue of there being no corresponding key at the DSR structure 1000) due to a previous deletion or deactivation of the data field and/or the data field not having been previously assigned a key 1001.

The key 1001 having an index of #345 has a size of "3 Bits", with a corresponding data field of the data field bit-vector 1002, is set to "101", or "5" encoded in binary on the 3 bits, indicating there are 5 cabins on the flight (e.g. of different classes, such as first class, business class, premium economy, economy, and super economy, and the like). Similarly, a key 1001 having an index of #4554 has a size of "32 Bits", with a corresponding data field of the data field bit-vector 1002, is set to a value indicating "B747" (e.g. a type of airplane) encoded in binary on the 32 bits (e.g. while not all of the 32 bits are depicted, they are nonetheless understood to be present).

Hence, as depicted, there are 4554 key positions of the DSR structure 1000, and 4554 corresponding data fields in the data field bit-vector 1002, with the values and/or placeholder values of the data fields of the data field bit-vector 1002 provided serially in a same order as the key positions of the DSR structure 1000.

Also depicted is a bit-vector 1004, which may be interchangeably referred to as a change indication bit-vector (CIBV) 1004 and/or a CIBV 1004, comprising a number of bits (e.g. 4554) that corresponds to a same number of key positions of the DSR structure 1000. Furthermore, a position of a bit in the CIBV 1004 corresponds to a corresponding index and/or position of a corresponding key 1001 and/or key position of the DSR structure 1000 and a corresponding index and/or position of a corresponding data field (e.g. either used and/or activated, or unused and/or deactivated and/or deleted) of the data field bit-vector 1002. Associations between respective key positions of the DSR structure 1000, bits of the CIBV 1004 and data fields of the data field bit-vector 1002 are shown using arrows therebetween.

It is further understood that, for clarity, and to show relationships between indices of key positions of the DSR structure 1000, respective bits of the CIBV 1004, and respective data fields of the data field bit-vector 1002, indices shown for the data field bit-vector 1002 are for respective data fields thereof and not for the individual bits of the data field bit-vector 1002. For example, as the data field bit-vector 1002 is a bit vector, and comprises a plurality of serially arranged bits, the bits of the data field bit-vector 1002 may be indexed based on a respective bit position thereof. For example, presuming that all data fields with indices from #1 to #344 are 1 bit data fields, then the indices of the data fields are the same as respective indices of the bits. However, the data field having a depicted index of #345 is 3 bits in length; as such the first bit of the data field having a depicted index of #345 has a bit index of #345, however a second bit of the data field having a depicted index of #345 has a bit index of #346 and a third bit of the data field having a depicted index of #345 has a bit index of #347. As such, if all data fields of indices #345 to #4553 are 3 bits in length, the first bit of the data field having a depicted index of #4554 has a bit index of #126278 (e.g. ((4554-345)×3)+1), with the next bits indexed accordingly. Hence, such an example also shows that there may be two different index spaces associated with a DSR structure 1000, a corresponding CIBV 1004 and a corresponding data field bit-vector 1002: a key space and data bit index space; one space may be mapped to the other based on the DSR structure 1000 which indicates key indices of keys associated with respective data fields, as well as numbers of bits for the respective data fields.

As described hereafter, the CIBV 1004 may be used to indicate whether a data field of the data field bit-vector 1002 is being added or deleted. For example, herein, when a value of a bit of the CIBV 1004 is set to "0", a corresponding data field of the data field bit-vector 1002 is understood not to have been added or deleted, and when a value of a bit of the CIBV 1004 is set to "1", a corresponding data field of the data field bit-vector 1002 is understood to have been added or deleted. As depicted, all the bits of the CIBV 1004 are set to "0" indicating no present changes to any of the data fields. However, for example, when a seat is deleted from the flight (e.g. due to malfunctions in the seat, such that the seat is no longer eligible for booking, and/or for any other suitable reason), a corresponding data field of the data field bit-vector 1002 may be deleted, as may a respective key of the DSR structure 1000, and respective bit of the CIBV 1004 may change from "0" to "1".

Conversely, when a seat is added to a flight (e.g. as a previously malfunctioning seat has been fixed and is now eligible for booking, and/or when a seat, and/or block of seats is released for the flight), a corresponding data field may be added to the end of the data field bit-vector 1002, or an unused data field may be used to add the corresponding data field to the data field bit-vector 1002. Similarly, a respective key may be correspondingly added to the end of the DSR structure 1000, or a respective key may be added to an unused key position of the DSR structure 1000. Similarly, a bit of "1" may be added to the end of the CIBV 1004, or a respective bit of the CIBV 1004 may change from "0" to "1". Hence, in these examples, it is understood that the DSR structure 1000 and the data field bit-vector 1002 are updated accordingly to delete corresponding keys 1001 and data fields, or add corresponding keys 1001 and data fields.

The additions or deletions are, in some examples performed in a manner to avoid updating the indices. For example, when a deletion of a key 1001 and a data field occurs, the respective key position may be designated as <EMPTY> at the DSR structure 1000 with any values of the data field at the data field bit-vector 1002 set to a placeholder value. As such, it is understood that deletion of a data field at the data field bit-vector 1002 does not, in such examples, result in the bits for the data field being deleted; rather such bits may remain at the data field bit-vector 1002 but are understood not to be in use and/or change from being active (e.g. available for storing values) to inactive (e.g. unavailable for storing values). As such, while a deletion of a data field is understood to occur with respect to a primary database 315 which stores the data field bit-vector 1002, the actual bits data field of the data field bit-vector 1002 may still be present but in an unused and/or inactive and/or deactivated state, indicated by the corresponding key position of the DSR structure 1000 being <EMPTY>, and the like (e.g. to avoid shifting of the indices and/or renumbering of keys and data fields).

Similar, addition of a data field at the data field bit-vector 1002 at a position other than an end thereof, does not, in such examples, result in the bits for the data field being added; rather such bits may already be present, but not in use and/or inactive and/or deactivated until an addition occurs. As such, while an addition of a data field is understood to occur with respect to a primary database 315 which stores the data field bit-vector 1002, the actual bits data field of the data field bit-vector 1002 may already be present but are then used and/or placed into an activated state (e.g. the bits may change from an inactive to an active state), indicated by the corresponding key position of the DSR structure 1000 storing a respective new key 1001. It is understood that, in these examples, a length of the "new" data is restricted by the number of unused and/or inactive deactivated bits that are present and being changed to a used and/or activated state.

In contrast, when a data field is added to an end of the data field bit-vector 1002, there may be no restrictions on length, as any suitable number of bits for the new data field may be added to the end of the data field bit-vector 1002.

Regardless of format, such changes that occur at a primary database 315 should hence be synchronized with a corresponding replica database 515 as next described.

Figure 11:
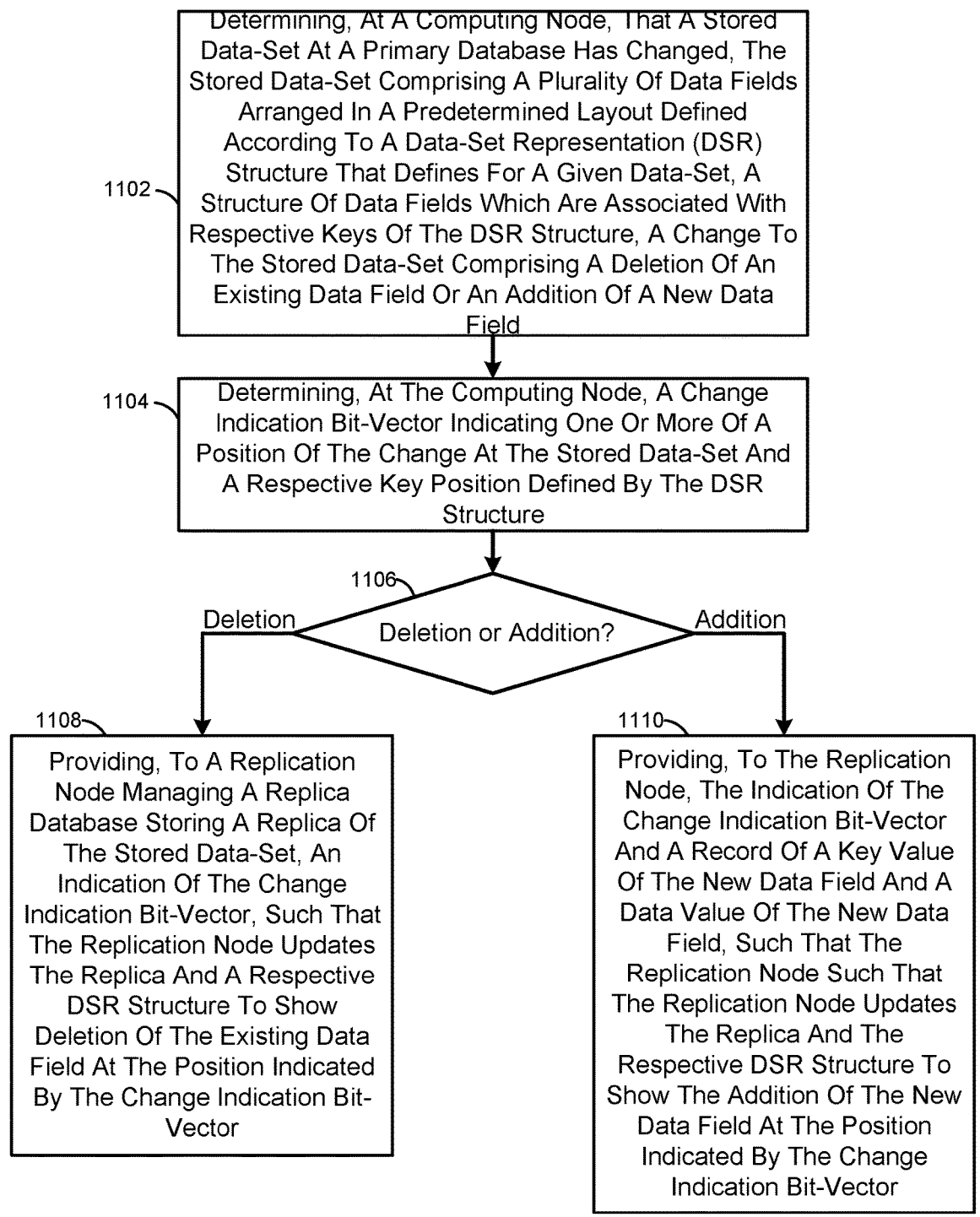
FIG. 11 depicts a method for synchronizing deletions or additions to fields at databases, according to non-limiting examples.

Attention is now directed to FIG. 11 which depicts a flowchart representative of a method 1100 for synchronizing deletions or additions to fields at databases. The operations of the method 1100 of FIG. 11 correspond to machine readable instructions that are executed by one or more of the engines of the primary processing module 320. The method 1100 of FIG. 11 is one way in which the primary computing node 300 and/or the system 50 may be configured, and/or the method 1100 may represent one or more particular modes in which the data preparation engine 326 may operate. However, while the method 1100 is specifically described with regards to being implemented by the primary processing module 320, it is understood that the method 1100 may be implemented by any suitable computing node of the system 50, and/or processing module thereof.

Furthermore, the following discussion of the method 1100 of FIG. 11 will lead to a further understanding of the system 50, and its various components.

The method 1100 of FIG. 11 need not be performed in the exact sequence as shown and likewise various blocks may be performed in parallel rather than in sequence. Accordingly, the elements of method 1100 are referred to herein as "blocks" rather than "steps." The method 1100 of FIG. 11 may be implemented on variations of the system 50 of FIG. 1, as well.

At a block 1102, the primary computing node 300 and/or the primary processing module 320 determines that a stored data-set at a primary database 315 has changed, the stored data-set comprising a plurality of data fields arranged in a predetermined layout defined according to a data-set representation (DSR) structure that defines for a given data-set, a structure of data fields which are associated with respective keys of the DSR structure, a change to the stored data-set comprising a deletion of an existing data field or an addition of a new data field.

Hence, for example, a stored data-set of the block 1102 may comprise the data field bit-vector 1002 which may be stored in a primary database 315, and the DSR structure of the block 1102 may comprise the DSR structure 1000. In the following description of the method 1100, in one example, it is understood that a seat may be deleted from the flight represented by the DSR structure 1000, and hence an existing data field of the data field bit-vector 1002 may be deleted (e.g. and/or deactivated), with the DSR structure 1000 updated accordingly to delete a respective key 1001. Similarly, in the following description of the method 1100, in another example, it is understood that a seat may be added to the flight represented by the DSR structure 1000, and hence a new data field may be added to the data field bit-vector 1002 (e.g. previously inactive bits are activated), with the DSR structure 1000 updated accordingly. Examples in which a new data field is added to an end of the data field bit-vector 1002 are described, as well as examples in which inactive bits are activated as the new data field of the data field bit-vector 1002, are described herein.

Furthermore, it is understood that the primary computing node 300 (e.g. the data preparation engine 326, and the like) may be generally configured to determine when the data field bit-vector 1002 is changing, for example upon receipt of information from a data source 100 indicating such a change, as well as a type of the change. For example, when the change comprises a deletion of a data field of the data field bit-vector 1002 (e.g. a deletion of a seat from the flight), the data field bit-vector engine 325 may update the data field bit-vector 1002 to delete the data field (e.g. change active bits to inactive bits) and the processing engine 322 may update the DSR structure 1000 accordingly.

Similarly, when the change comprises an addition of a data field of the data field bit-vector 1002 (e.g. an addition of a seat to the flight), the data field bit-vector engine 325 may update the data field bit-vector 1002 to add a data field, and the processing engine 322 may update the DSR structure 1000 accordingly. In these examples, a data value of the data field (e.g. "0" or "1" to indicate whether an added seat is not booked or booked) may also be received from a data source 100, with the data field of the data field bit-vector 1002 populated accordingly. Alternatively, a default value, such as "0", may be used as the data value of the data field.

At a block 1104, the primary computing node 300 and/or the primary processing module 320 determines a change indication bit-vector indicating one or more of a position of the change at the stored data-set and a respective key position defined by the DSR structure 1000.

For example, the change indication bit-vector of the block 1104 may comprise the CIBV 1004, which is understood to comprise a plurality of bits arranged serially, each of the plurality of bits corresponding to a respective key position of the DSR structure. In particular, a bit, of the plurality of bits that indicates the position of the change is understood to have a first binary value, such as "1", and other bits of the plurality of bits (e.g. that indicate no change) have a second binary value, such as "0". However, while examples described herein use the binary value "1" to indicate a change and the binary value "0" to indicate no change, in other examples, the binary value "0" may indicate a change and the binary value "1" may indicate no change.

Hence, for example, when a data field of the data field bit-vector 1002 corresponding to a key 1001 having an index of #46 is deleted, then bit #46 of the CIBV 1004 may be set to "1", while other bits of the CIBV 1004 remain at "0".

Similarly, when a new data field is added to an end of the data field bit-vector 1002 a new bit may be added to the end of CIBV 1004, which is set to "1", while other bits of the CIBV 1004 remain at "0".

Similarly, when a new data field of the data field bit-vector 1002 corresponding to a key position having an index of #47 is added, then bit #47 of the CIBV 1004 may be set to "1", while other bits of the CIBV 1004 remain at "0".

At a block 1106, the primary computing node 300 and/or the primary processing module 320 determines that the change is a deletion of an existing data field or an addition of a new data field. The block 1106 may implemented in conjunction with any of the blocks 1102, 1106, however, such that a type of the change may be determined when the data field bit-vector 1002 is changed.

When the change comprises the deletion of an existing data field (e.g., a decision "Deletion" at the block 1106), at a block 1108, the primary computing node 300 and/or the primary processing module 320 provides, to a replication computing node 500 managing a replica database 515 storing a replica of the stored data-set, an indication of the change indication bit-vector, such that the replication computing node 500 such that the replication computing node 500 updates the replica and a respective DSR structure to show deletion of the existing data field at the position indicated by the change indication bit-vector.

In some examples, the indication of the change indication bit-vector may comprise the CIBV 1004 determined at the block 1104. Hence, the indication of the change indication bit-vector may comprise a plurality of bits arranged serially, each of the plurality of bits corresponding to a respective key position of the DSR structure 1000. Similarly, the indication of the change indication bit-vector may comprise a plurality of bits arranged serially, each of the plurality of bits corresponding to a respective key position of the DSR structure 1000, with a bit of the plurality of bits that indicates the position of the change having a first binary value (e.g. "1"), and other bits of the plurality of bits having a second binary value (e.g. "0").

However, in other examples, the indication of the change indication bit-vector may be compressed using, for example, using one or more of run length encoding (RLE) and variable length encoding (VLE). For example, in the example above, where a 46$^{th}$ bit (e.g. having an index of #46) of the CIBV 1004 comprises a value of "1", and other bits of the CIBV 1004 have values of "0", such that the CIBV 1004 comprises 45 instance of "0", 1 instance of "1", and 4508 more instances of "0", an RLE algorithm and/or engine would compress the CIBV 1004 to "45-4508", with "45" and "4508" each representing a respective number of serially arranged bits having a value of "0", that are separated by a bit having a value of "1". Adding VLE to the compression, a VLE algorithm and/or engine may binarily encode the number "45" on 1 bytes (e.g. 8 bits, of which only 7 bits are may be used to encode the integer)), with first bit set to 0 to indicate there is a single byte used, then it would encode 4508 on 2 bytes (e.g. 16 bits, of which only 14 bits are used to encode the integer) with the first bit of the first byte set to 1 to indicate there is a second byte, and then setting the continuation bit on that second byte to zero. Hence 24 bits are used to encode 4554 bits, compression ratio of about 190 (e.g. 4554/24).

However, any suitable compression algorithm (and/or engine) may be used to compress the CIBV 1004, and it is understood that a replication computing node 500 is similarly configured to decompress a compressed CIBV 1004 using corresponding decompression algorithms (and/or engines).

Put another way, the method 1100 may further comprise the primary computing node 300 and/or the primary processing module 320 compressing the indication of the change indication bit-vector prior to providing the change indication bit-vector to the replication computing node 500 using one or more of a compression algorithm, run length encoding and variable length encoding and/or any other suitable compression algorithm.

Regardless of the format of the indication of the change indication bit-vector, at the block 1108, the primary computing node 300 and/or the primary processing module 320 provides and/or transmits the indication to a replication computing node 500 and/or all the replication nodes 500. The indication may be transmitted with an identifier of the stored data-set at which the deletion of the existing data field occurred such that a replication computing node 500 that receives the indication of the change indication bit-vector may delete the corresponding existing field from a replica of the data-set stored at a replica database 515, and update a respective DSR structure accordingly. Alternatively, the indication may be transmitted on a channel between the nodes 300, 500 dedicated to the stored data-set, and the like.

Furthermore, the indication of the change indication bit-vector that is transmitted, for example as a message to a replication computing node 500, may correspond to the synchronization data described above.

When the change comprises the addition of the a data field (e.g., a decision "Addition" at the block 1106), at a block 1110, the primary computing node 300 and/or the primary processing module 320 provides, to the replication computing node 500, the indication of the change indication bit-vector and a record of a key value of the new data field and a data value of the new data field, such that the replication computing node 500 updates the replica and the respective DSR structure to show the addition of the new data field at the position indicated by the change indication bit-vector.

Furthermore, in these examples, the indication of the change indication bit-vector may depend on where an addition occurred to the data field bit-vector 1002 and the DSR structure 1000, which is described hereafter. Regardless, in these examples, the primary computing node 300 and/or the primary processing module 320 generates a record that includes a key value of the new data field and a data value of the new data field.

Continuing with the previous example, where seats may be added to a flight, and with brief reference back to FIG. 10, a key value of an added seat may have a format of "AF2345-20210930-XXX", where XXX is a seat number of the added seat, and a data value may comprise "0" assuming the added seat has not yet been booked, or a data value may comprise "1" assuming the added seat has been booked.

In some examples, the record may further comprise one or more of a length of the key value (e.g. in bits), a length of the data value (e.g. in bits) of the new data field, a respective length of the new data field, a data type of the new data field. For example, a length of the key value may be "8 Bytes" to indicate an amount of memory to be used to store the key value. A data type of the new data field may indicate a length of the new data field, for example "1 Bit" or any other suitable number of bits (and/or bytes), to indicate a number of bits to be added to a respective DSR structure at a replication computing node 500 to store the data value. The length of the new data field may be limited, however, to an existing number of inactive bits of the data field bit-vector 1002 that are being activated as the new data field.

Indeed, any suitable format for the record is within the scope of the present specification. In some particular examples, the system 50 may operate according to certain predefined data types. For example, a data type of a data field of "Integer" may have an associated length of 32 bits; as such, the record may indicate one of a data type of "Integer" (e.g. integer numbers) or a data field length of "32 bits" to indicate a data field length of "32 bits". Similarly, a data type of a data field of "Boolean" may have an associated length of 1 bits as such, the record may indicate one of a data type of "Boolean" or a data field length of "1 bit" to indicate a data field length of "1 bit" However, in contrast a data type of a data field of "String" into which strings are encoded, the record may provide both a length of the data field and an encoding type for the data field; for example, a length may be "256 bits" and an encoding type may be "UTF-8" may be provided at the record. Similarly, for other data types of data fields, the record may provide both a length of the data field and an encoding type for the data field; for example, for a data type of a "Song", a length may be "3544678 bits" and an encoding type may be "MP3".

In a particular, a record may have a format of "Key Length|Key Value|Data Type|Data Value", but encoded into binary and optionally compressed using any suitable compression algorithm (including, but not limited to, RLE and VLE).

In examples where the key value length and the data type are optional, the primary computing node 300 and the replication nodes 500 may be configured to use a fixed predetermined key value length, and a fixed predetermined data type and/or a fixed predetermined length of new data fields, so their inclusion in the record may be redundant.

In examples where the addition of the new data field is indicated at an end of data field bit-vector 1002 (e.g. as an example of the stored data-set of the block 1102), with a new key being added to an end of the DSR structure 1000, the indication of the change indication bit-vector may comprise the record itself. In other words, transmission of the record without the CIBV 1004 (e.g. compressed or not compressed) may generally indicate, to a replication computing node 500 receiving the record, that a key having a key value indicated by the record is to be added to the end a respective DSR structure, and a data field having the data value indicated by the record is to be added to the end a respective data field bit-vector. Hence, the term "indication of a bit-vector" is understood to include any suitable set of data that indicates a position of a suitable change (e.g. a deletion or an addition of a data field) to a stored data set that is indicated by the bit-vector determined at the block 1102.

Indeed, the record that is transmitted (with or without the CIBV 1004, either compressed or uncompressed), for example as a message to a replication computing node 500, may correspond to the synchronization data described above.

In contrast, in examples where the addition of the new data field is indicated as being at a position other than at an end of the data field bit-vector 1002 (e.g. as an example of the stored data-set of the block 1102), for example by activating inactive bits of an inactive data field at the position, and having a length corresponding the number of the inactive bits at the position, with a new key being added to a corresponding unused key position of the DSR structure 1000, the indication of the change indication bit-vector may comprise the CIBV 1004 (e.g. compressed or not compressed) which is transmitted to a replication computing node 500 with the record. Hence, a replication computing node 500, receiving the CIBV 1004, would add a key, having a key value indicated by the record, at a respective DSR structure at a respective unused key position as indicated by the CIBV 1004 (and having a suitable length which may be indicated by the record). The replication computing node 500 would further activate, at a respective data field bit-vector, inactive bits at a respective inactive data field to indicate the data value indicated by the record (and/or having a suitable length which may also be indicated by the record but restricted to the number of already present inactive bits).

Put another way, when the addition of the new data field is indicated other than at an end of the DSR structure 1000, the addition of the new data field occurs at a respective position of the stored data-set that corresponds to a previously deleted data field or a previously unused data field.

Furthermore, the record and the change indication bit-vector may be in a compressed, or uncompressed format (e.g. compressed using RLE and/or VLE, or uncompressed). Put another way, when the addition of the new data field is indicated other than at an end of the DSR structure 1000, the indication of the change indication bit-vector may comprise the record and the change indication bit-vector in a compressed, or uncompressed format. In particular, one or more of the record and the change indication bit-vector may be compressed.

Indeed, the indication of the change indication bit-vector (e.g., the CIBV 1004, either compressed or uncompressed) and the record that is transmitted, for example as a message to a replication computing node 500, may correspond to the synchronization data described above.

It is further understood that at the block 1108 and the block 1110, a message type indicator may be transmitted with a message that includes the indication of the change indication bit-vector and/or the record. Such a message type indicator would indicate to a replication computing node 500 that the message includes synchronization data to update a DSR structure and an associated data field bit-vector, such that the replication computing node 500 receiving the message processes the message accordingly.

It is further understood that, when the change determined at the block 1102 comprises both deletion of an existing data field and addition of a new data field, the change indication bit-vector determined at the block 1104 may indicate respective positions of both the deletion and the addition at the DSR structure 1000 and/or the data field bit-vector 1002. For example, bits of the CIBV 1004 may indicate any suitable number of additions and/or deletions. When more than one addition is indicated by the CIBV 1004, the CIBV 1004 (e.g. either compressed or compressed) may be provided with a plurality of records that comprise respective key values and data values of respective new data fields, for example in an order that is the same as the additions indicated in the CIBV 1004. Hence, a first instance of a "1" in the CIBV 1004 that corresponds to a first addition may indicate that a first record provides a key value and a data value of a first new data field, a second instance of a "1" in the CIBV 1004 that corresponds to a second addition may indicate that a second record (e.g. that follows the first record) provides a key value and a data value of a second new data field, etc.

It is understood that the replication computing node 500 may distinguish a "1" of the CIBV 1004 as corresponding to a deletion or an addition based on whether a corresponding validity bit at a corresponding key position of a respective DSR structure is "1" (e.g. "true") or "0" (e.g. "false"). For example, a "1" of the CIBV 1004 corresponds to a deletion of a data field and a corresponding key, when a validity bit at a corresponding key position of a respective DSR structure is "1" indicating that a key 1001 exists at the corresponding key position and hence an active data field exists at a corresponding data value bit-vector. Conversely, a "1" of the CIBV 1004 corresponds to an addition of a data field and a corresponding key, when a validity bit at a corresponding key position of a respective DSR structure is "0" indicating that no key 1001 exists at the corresponding key position and hence no active data field exists at a corresponding data value bit-vector.

It is further understood that when a "1" (or more than one "1") is at an end of the CIBV 1004 at positions that are greater than existing key positions of the respective DSR structure managed by the replication computing node 500, such a "1" indicates an addition (and/or more than one "1" indicates more than one addition).

In this manner, the primary computing node 300 may propagate deletions of, and/or additions to, data fields of a stored data-set at a primary database 315 to respective stored data-sets at a replica database 515 maintained by a replication computing node 500.

Figure 12:
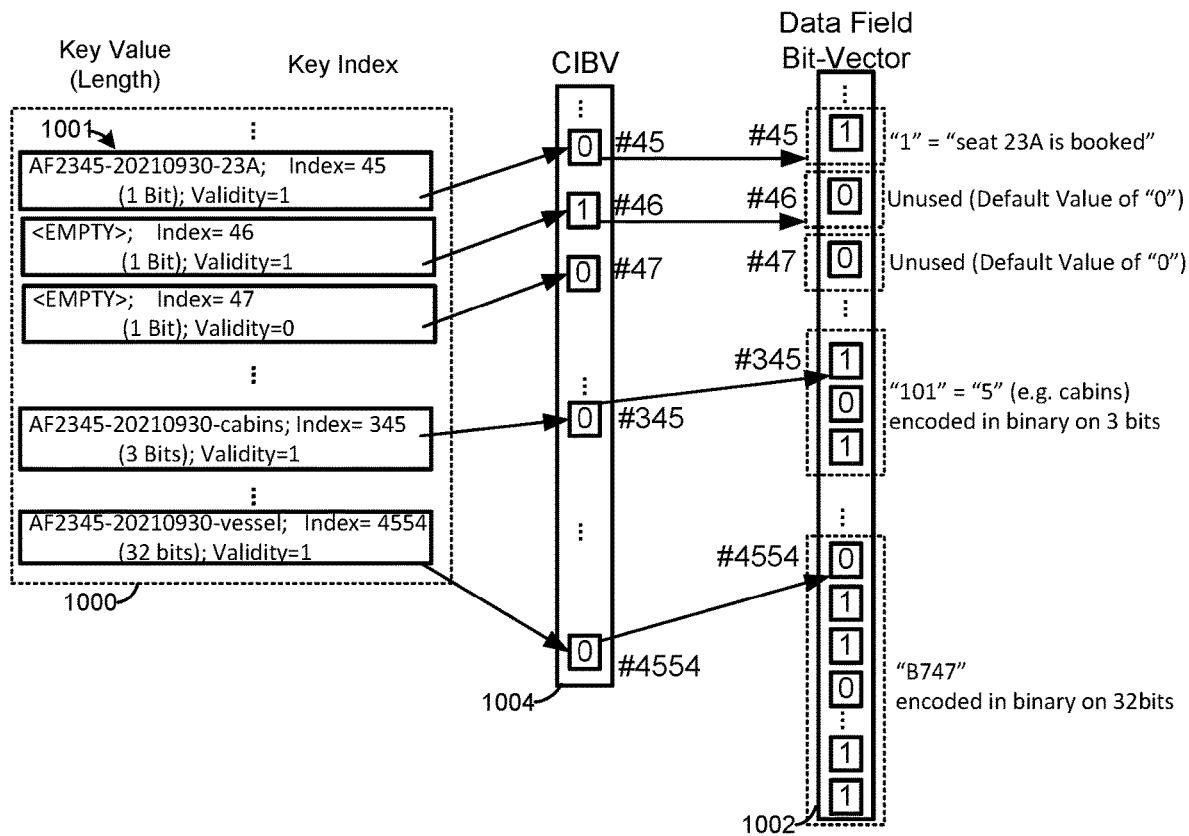
FIG. 12 depicts a deletion of a key, from a DSR structure, indicating a deletion of a data field of a corresponding data field bit-vector, as well as a resulting change indication bit-vector indicating the position of the deletion, according to non-limiting examples.
Figure 13:
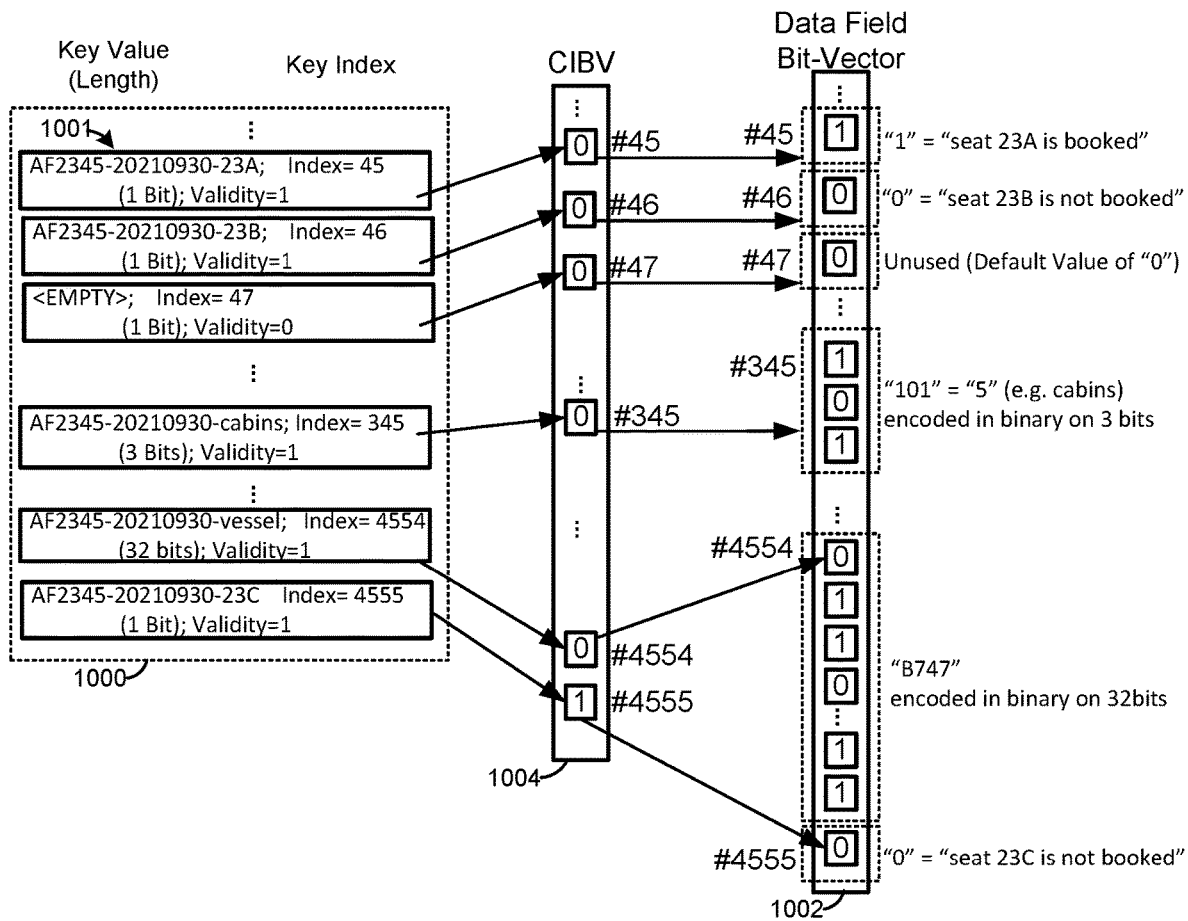
FIG. 13 depicts an addition of a key to an end of a DSR structure, indicating an addition of a data field to an end of a corresponding data field bit-vector, as well as a resulting change indication bit-vector indicating the position of the addition, according to non-limiting examples.
Figure 14:
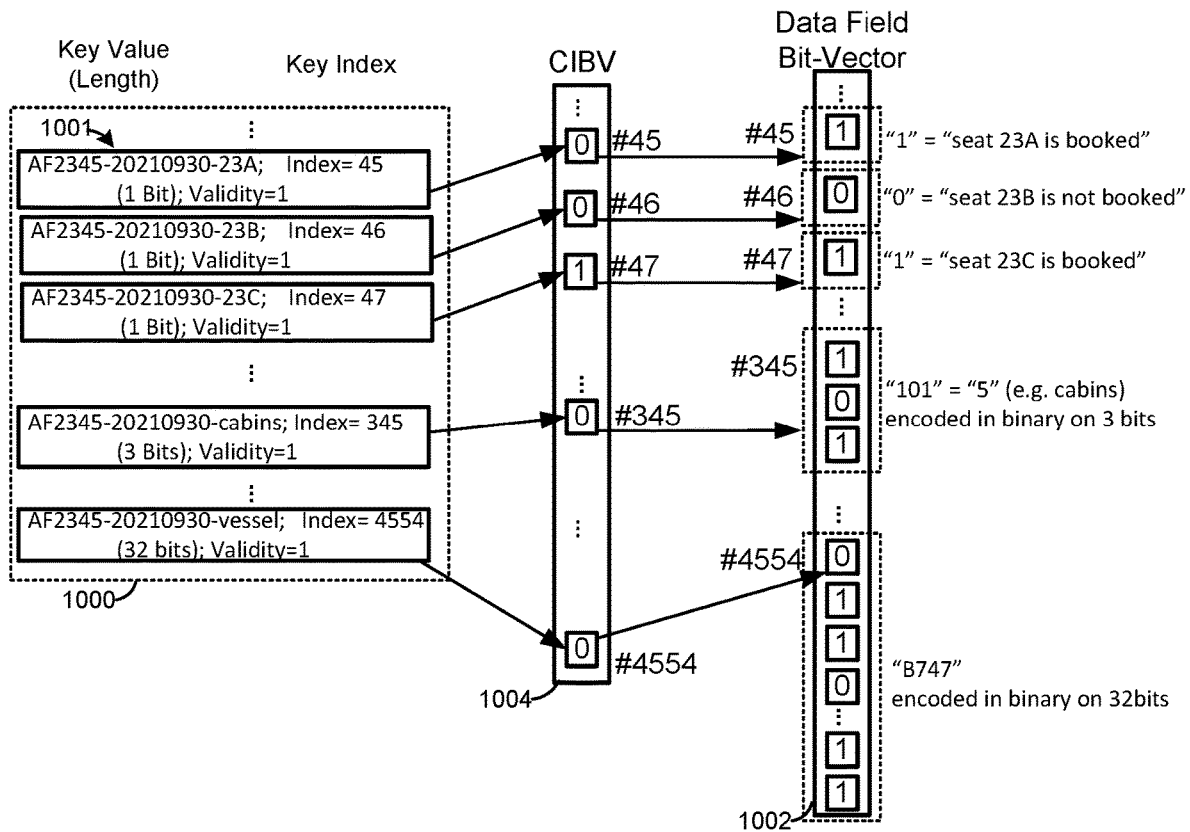
FIG. 14 depicts an addition of a key to a middle of a DSR structure, indicating an addition of a data field to a middle of a corresponding data field bit-vector, as well as a resulting change indication bit-vector indicating the position of the addition, according to non-limiting examples.

Attention is next directed to FIG. 12, FIG. 13 and FIG. 14 which depicts deletions from, and additions to, the DSR structure 1000 and the data field bit-vector 1002, relative to their respective states depicted in FIG. 10, which may occur when information is received at the primary computing node 300 from a data source 100.

For example, FIG. 12 depicts a deletion from the DSR structure 1000 and the data field bit-vector 1002. In particular, a key 1001 having an index #46 is deleted from the DSR structure 1000 (e.g. the seat 23B is removed from the flight), and the corresponding data field having the index #46 is deleted from the data field bit-vector 1002. As a result, the primary computing node 300 changes the $46^{th}$ bit of the CIBV 1004 from "0" to "1". Furthermore, the key position at the index of #46 is now depicted as being <EMPTY> and the corresponding bit of the corresponding data field of the data field bit-vector 1002 at the index #46 is shown as being "Unused" and set to a default value of "0".

FIG. 13 depicts an addition to an end of the DSR structure 1000 and the data field bit-vector 1002. In particular, a key 1001 having an index #4445 is added to the end of DSR structure 1000, for example to add a seat "23C" to the flight, and a corresponding data field having an index #4445 is added to the end of the data field bit-vector 1002. As a result, the primary computing node 300 adds a $4445^{th}$ bit to the CIBV 1004 and sets the value to "1" indicating the addition of a key 1001 having an index of #4445 to the DSR structure 1000 and the addition of a data field having the index of #4445 to the data field bit-vector 1002 (e.g. having a value of "0" indicating that the seat 23C is not booked). The primary computing node 300 further adds a validity bit of "1" to the new key 1001, and while not depicted may assign a level to the new key 1001.

FIG. 14 depicts an addition to a middle of the DSR structure 1000 and the data field bit-vector 1002. In particular, a key 1001 is added to the key position having an index #47 at the DSR structure 1000, which was previously <EMPTY>, for example to add a seat "23C" to the flight, and a corresponding data field having an index #47 is activated at the data field bit-vector 1002 (e.g. having a value of "1" indicating that the seat 23C is booked). As a result, the primary computing node 300 changes the $47^{th}$ bit of the CIBV 1004 from "0" to "1". The primary computing node 300 further adds a validity bit of "1" to the new key 1001, and while not depicted may assign a level to the new key 1001.

Figure 15:
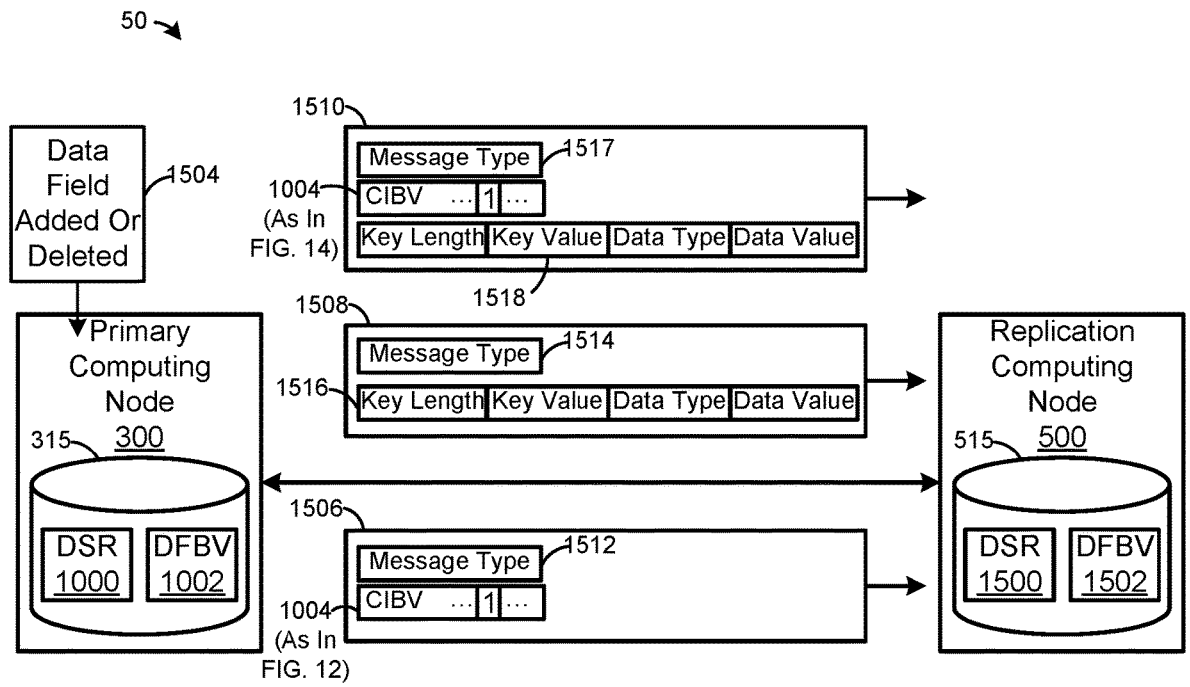
FIG. 15 depicts a portion of the system of FIG. 1, with different messages from a primary computing node to a replication computing node, to cause the replication computing node to update a respective DSR structure and a respective data field bit-vector according to changes indicated in the messages, according to non-limiting examples.

Attention is next directed to FIG. 15 which depicts a portion of the system 50. While not all components are depicted, it is nonetheless understood that they are present.

In particular, FIG. 15 depicts the primary computing node 300 in communication with one replication computing node 500. FIG. 15 further depicts, at the primary communication node 300, a primary database 315 at which is stored the DSR structure 1000 and the corresponding data field bit-vector 1002. FIG. 15 further depicts, at the replication computing node 500, a replica database 515 at which is stored a respective DSR structure 1500 and a corresponding respective data field bit-vector 1502. It is understood that, initially, the respective DSR structure 1500 and the respective data field bit-vector 1502 may be in same respective states as the DSR structure 1000 and the corresponding data field bit-vector 1002.

However, as depicted, a change message 1504 is received at the primary computing node 300, for example from a data source 100, that indicates that a data field is to be added or deleted from the data field bit-vector 1002, for example as depicted in FIG. 12, FIG. 13 and FIG. 14. The primary computing node 300 may generally update the DSR structure 1000 and the data field bit-vector 1002 to implement the change as depicted in FIG. 12, FIG. 13 and FIG. 14. Whether additions are made to ends of the DSR structure 1000 and the data field bit-vector 1002, or at other positions, may depend on a mode of the primary computing node 300 and/or the system 50; indeed, in general, additions may occur in any suitable manner and may be end additions, or may be middle additions, and/or may depend on whether there are any unused key positions at the DSR structure 1000, and the like.

Furthermore, depending on a type of the change and/or a mode of the primary computing node 300, in order to synchronize the DSR structure 1500 and the data field bit-vector 1502, respectively with the DSR structure 1000 and the data field bit-vector 1002, the primary computing node 300 may generate and transmit synchronization data 1506, synchronization data 1508 or synchronization data 1510 to the replication computing node 500.

For example, in the case of the deletion shown in FIG. 12, the synchronization data 1506 may be transmitted which includes a message type indicator 1512 (e.g. which may comprise binary data of any suitable size, such as 1 byte, or 8 bits, and the like, indicating that the synchronization data 1506 comprises a deletion). The synchronization data 1506 further comprises an indication of the position of the change indicated by the CIBV 1004 as depicted in FIG. 12, in the form of the CIBV 1004 of FIG. 12, which may be compressed. When the replication computing node 500 receives the synchronization data 1506, the DSR 1500 and the data field bit-vector 1502 may be updated similar to the DSR structure 1000 and the data field bit-vector 1002 as depicted in FIG. 12.

In contrast, in the case of the addition shown in FIG. 13, the synchronization data 1508 may be transmitted which includes a message type indicator 1514 (e.g. which may comprise binary data of any suitable size, such as 1 byte, or 8 bits, and the like, indicating that the synchronization data 1508 comprises an addition). The synchronization data 1508 further comprises an indication of the position of the change indicated by the CIBV 1004 as depicted in FIG. 13, in the form of a record 1516 (e.g. without the CIBV 1004), indicating that the addition is to be at ends of the DSR structure 1500 and the data field bit-vector 1502. Alternatively, the synchronization data 1508 may include the CIBV 1004 as depicted in FIG. 13. The record 1516 is in the form of "Key Length|Key Value|Data Type|Data Value" and hence may comprise (e.g. for the addition of the seat 23C): "120 bits|AF2345-20210930|Boolean|0", however converted to binary; for example, as "AF2345-20210930" is 15 characters long, and assuming ASCII (American Standard Code for Information Interchange) for the key value encoding, a key length is 15 bytes or 120 bits; similarly, the data type of "Boolean" indicates that a Data Value (e.g. a seat) is either "0" (e.g. as depicted) or "1". Furthermore, while a delimiter of "|" is used, any suitable delimited is within the scope of the present specification including, but not limited to, use of predetermined lengths of the fields of the record 1516. When the replication computing node 500 receives the synchronization data 1508, the DSR 1500 and the data field bit-vector 1502 may be updated similar to the DSR structure 1000 and the data field bit-vector 1002 as depicted in FIG. 13.

While not depicted, the record 1516 may also include an indicator a length of the data value (e.g. such as "1 Byte") and/or a length of the data value may be inherent to the data type of the record 1516. However, any suitable indicator for indicating the length of the data value is within the scope of the present specification.

However, in the case of the addition shown in FIG. 14, the synchronization data 1510 may be transmitted which includes a message type indicator 1517 (e.g. which may comprise binary data of any suitable size, such as 1 byte, or 8 bits, and the like, indicating that the synchronization data 1510 comprises an addition. The synchronization data 1510 further comprises an indication of the position of the change indicated by the CIBV 1004 as depicted in FIG. 14, in the form of the CIBV 1004 as depicted in FIG. 14, which may be compressed, and which indicates the position of the addition in the middle of the DSR structure 1000 and the data field bit-vector 1002. However, the synchronization data 1510 further comprises a record 1518 which is understood to be similar to the record 1516. When the replication computing node 500 receives the synchronization data 1510, the DSR 1500 and the data field bit-vector 1502 may be updated similar to the DSR structure 1000 and the data field bit-vector 1002 as depicted in FIG. 14.

It is further understood by comparing the CIBVs 1004 as depicted in FIG. 15 with the CIBVs 1004 depicted elsewhere in the present specification, that a vector and/or a bit-vector depicted herein may be in the form of a row (e.g. as in FIG. 15) or a column (e.g. as in FIGS. 7 to 10 and FIGS. 12 to 14), and/or a vector and/or a bit-vector in a row format may be transposed to a column format, and vice versa. Put another way, vectors and/or bit-vectors herein in may be provided in any suitable format.

Other features for synchronizing changes between stored data-sets, for example when data of a field of a data bit-vector changes at the primary computing node, are within the scope of the present specification.

Figure 16:
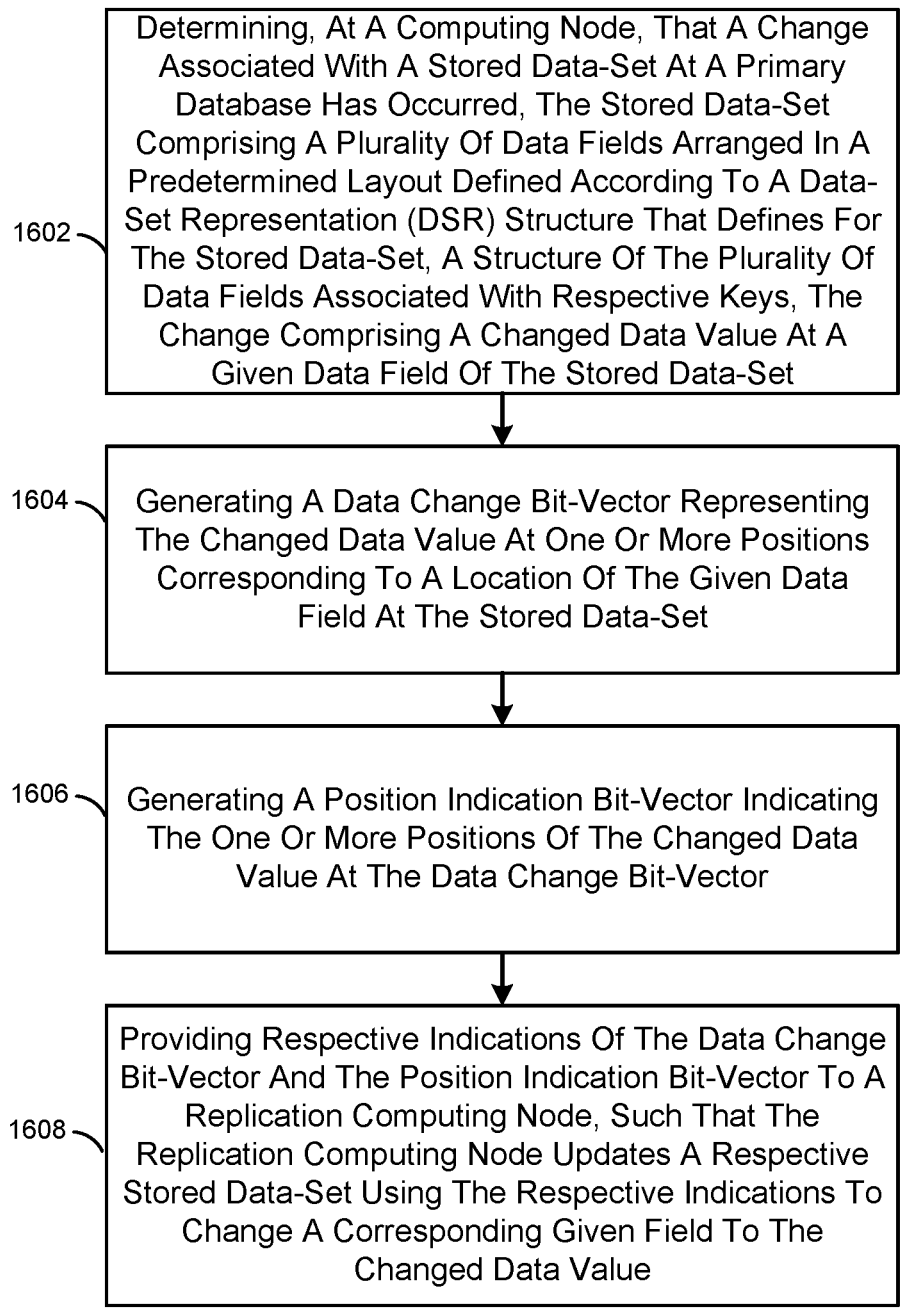
FIG. 16 depicts a method for synchronizing changes to fields at databases, according to non-limiting examples.

For example, attention is now directed to FIG. 16 which depicts a flowchart representative of a method 1600 for synchronizing changes to fields at databases. The operations of the method 1600 of FIG. 16 correspond to machine readable instructions that are executed by one or more of the engines of the primary processing module 320. The method 1600 of FIG. 16 is one way in which the primary computing node 300 and/or the system 50 may be configured, and/or the method 1600 may represent one or more particular modes in which the data preparation engine 326 may operate. However, while the method 1600 is specifically described with regards to being implemented by the primary processing module 320, it is understood that the method 1600 may be implemented by any suitable computing node of the system 50, and/or processing module thereof.

Furthermore, the following discussion of the method 1600 of FIG. 16 will lead to a further understanding of the system 50, and its various components.

The method 1600 of FIG. 16 need not be performed in the exact sequence as shown and likewise various blocks may be performed in parallel rather than in sequence. Accordingly, the elements of method 1600 are referred to herein as "blocks" rather than "steps." The method 1600 of FIG. 16 may be implemented on variations of the system 50 of FIG. 1, as well.

At a block 1602, the primary computing node 300 and/or the primary processing module 320 (and/or a suitable engine thereof) determines that a change associated with a stored data-set at a primary database 315 has occurred, the stored data-set comprising a plurality of data fields arranged in a predetermined layout defined according to a DSR structure that defines for the stored data-set, a structure of the plurality of data fields associated with respective keys, the change comprising a changed data value at a given data field of the stored data-set. An example of the block 1602 is described below with respect to FIG. 19 and FIG. 20.

At a block 1604, the primary computing node 300 and/or the primary processing module 320 generates a data change bit-vector representing the changed data value at one or more positions corresponding to a location of the given data field at the stored data-set. An example of the block 1604 is described below with respect to FIG. 18.

At a block 1606, the primary computing node 300 and/or the primary processing module 320 generates a position indication bit-vector indicating the one or more positions of the changed data value at the data change bit-vector. Different examples of the block 1604 is described below with respect to FIG. 19, FIG. 21 and FIG. 22.

At a block 1608, the primary computing node 300 and/or the primary processing module 320 provides respective indications of the data change bit-vector and the position indication bit-vector to a replication computing node 500, such that the replication computing node 500 updates a respective stored data-set (e.g. at a replication database 515) using the respective indications to change a corresponding given field to the changed data value. Different examples of the block 1608 is described below with respect to FIG. 19, FIG. 20, FIG. 21 and FIG. 22.

Examples of the method 1600 are next described with respect to FIG. 17, FIG. 18, FIG. 19, FIG. 20, FIG. 21 and FIG. 22.

Figure 17:
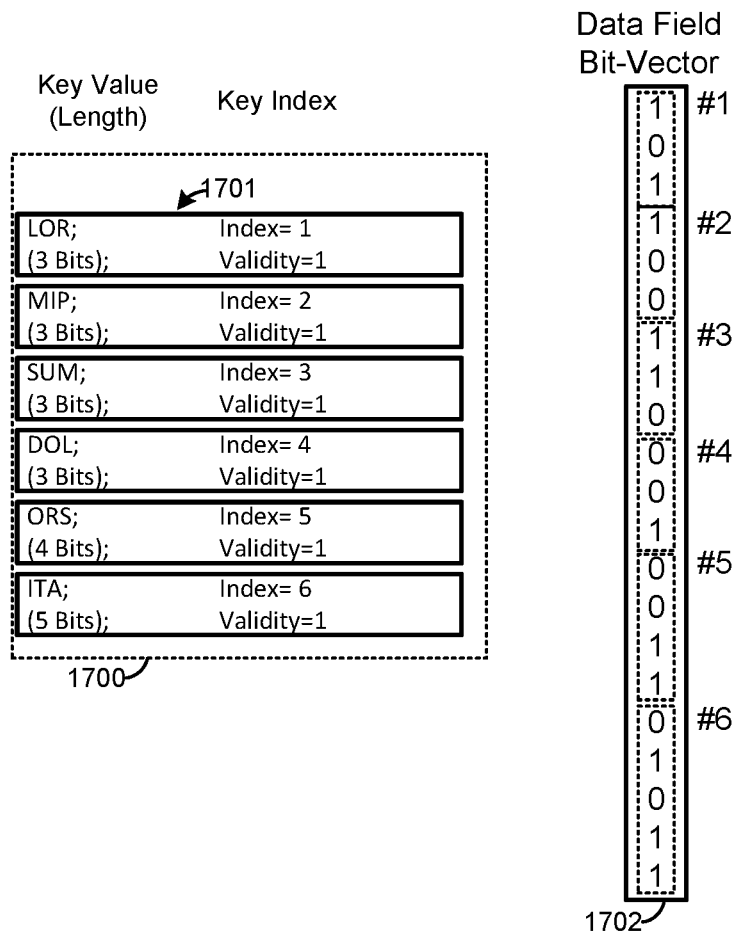
FIG. 17 depicts another example DSR mapped to an example data field bit-vector, according to non-limiting examples.

Attention is next directed to FIG. 17 which depicts a DSR 1700 comprising a plurality of keys 1701, which defines a layout of a data field bit-vector 1702. As depicted, there are example six keys 1701 defining a layout of six data fields of the data field bit-vector 1702, similar to the DSR 1000 and the data field bit-vector 1002. While only six keys and six data fields are depicted, the DSR 1700 and the data field bit-vector 1702 may respectively include any suitable number of keys 1701 and data fields, including, but not limited to, tens, hundreds and thousands of keys 1701 and data fields.

In particular, the keys 1701 include: a first key, named "LOR", having an index "1", indicating that a first data field, also having an index "1" of the data field bit-vector 1702, has a length of 3 bits; a second key, named "MIP", having an index "2", indicating that a second data field, also having an index "2" of the data field bit-vector 1702, has a length of 3 bits; a third key, named "SUM", having an index "3", indicating that a third data field, also having an index "3" of the data field bit-vector 1702, has a length of 3 bits; a fourth key, named "DOL", having an index "4", indicating that a fourth data field, also having an index "4" of the data field bit-vector 1702, has a length of 3 bits; a fifth key, named "ORS", having an index "5", indicating that a fifth data field, also having an index "5" of the data field bit-vector 1702, has a length of 4 bits; and a sixth key, named "ITA", having an index "6", indicating that a sixth data field, also having an index "6" of the data field bit-vector 1702, has a length of 5 bits. As depicted, the six data fields of the data field bit-vector 1702 have respective values, in order of indices #1 to #6, of "101", "100", "110", "001", "0011", and "01011".

While the previous examples of a DSR 1000 and a data field bit-vector 1002 were specific to a flight, the DSR 1700 and a data field bit-vector 1702 may store keys and data for any suitable application, including, but not limited to, travel industry applications.

Attention is next directed to FIG. 18, which depicts a portion of the system 50, similar to as depicted in FIG. 15, with a primary databases 315 of the primary computing node 300 storing the DSR 1700 and the data field bit-vector 1702. As depicted, copies of the DSR 1700 and the data field bit-vector 1702 are stored at a replication database 515, as a DSR 1800 and a data field bit-vector 1802. Initially the DSRs 1700, 1800 are the same, and the data field bit-vectors 1702, 1802 are the same. For example, depicted adjacent the nodes 300, 500, are the respective data field bit-vectors 1702, 1802 in an initial state, each being the same. While the DSRs 1700, 1800 are not depicted, they are both understood to be the same as depicted in FIG. 17.

However, as depicted, a change message 1804 is received at the primary computing node 300, for example from a data source 100, that indicates that a value of the data field having an index #3 is to be changed to "001" (e.g. from "110").

Attention is next directed to FIG. 19, which is substantially similar to FIG. 18, with like components having like numbers, however, the primary computing node 300 has changed the data field having index #3, of the data field bit-vector 1702 from "110" to "001". For clarity, to show this change at FIG. 19, value of the data field having index #3 is depicted in bold, and underlined.

As such, the primary computing node 300 is understood to determine (e.g. at the block 1602 of the method 1600), that a change associated with a stored data-set at a primary database 315 has occurred; in particular, the change comprising a changed data value (e.g. from "110" to "001") at the given data field having index #3 of the stored data field bit-vector 1702. However, the data field bit-vector 1802 stored at the replication database 525 has not yet changed.

As such, the primary computing node 300 generates and transmits synchronization data 1900 to the replication computing node 500 to cause the replication computing node 500 to change the given data field having index #3 of data field bit-vector 1802 from "110" to "001".

In particular, the primary computing node 300 generates (e.g. at the block 1604 of the method 1600) a data change bit-vector 1902 (labelled "DCBV" in FIG. 19) representing the changed data value at one or more positions corresponding to a location of the given data field at the stored data-set.

In particular, the data change bit-vector 1902 is a same length as the data field bit-vector 1702 (e.g. a same number of bits arranged serially). Hence, at positions of the data change bit-vector 1902, corresponding to the third data field of the data field bit-vector 1802 (e.g. as indicated by the dashed lines 1903 between the bit-vectors 1702, 1902), the data change bit-vector 1902 includes the changed data value of "001" on consecutive bits. Otherwise, other bits, referred to hereafter as placeholder bits, of the data change bit-vector 1902 have placeholder bit values of a given binary value of "0", though a given binary value of "1" may alternatively be used. In particular, the placeholder bits are used to ensure that the bit-vectors 1702, 1902 are a same length. Put another way, for each bit of the data field bit-vector 1702 that has not changed, a corresponding bit of the data change bit-vector 1902 has a placeholder bit value of "0", or any other suitable value.

However, should such a data change bit-vector 1902 be transmitted to the replication computing node 500, the replication computing node 500 could not distinguish between bits that have changed and bits that have not changed.

Hence, the primary computing node 300 generates (e.g. at the block 1606 of the method 1600) a position indication bit-vector 1904 indicating the one or more positions of the changed data value at the data change bit-vector 1902.

In particular, as depicted, the position indication bit-vector 1904 (labelled "PIBV" in FIG. 19) is a same length as the data field bit-vector 1702 and the data change bit-vector 1902 (e.g. the position indication bit-vector 1904 comprises a same number of bits, arranged serially, as the bit-vectors 1702, 1902). However, a subset of the bits of the position indication bit-vector 1904, that are at same respective positions of the changed data value of the data change bit-vector 1902, are of a different given binary value than other bits of the position indication bit-vector 1904, which may also be referred to as placeholder bits, and which are used to ensure that the bit-vectors 1702, 1902, 1904 are a same length.

Hence, for example, bits of the position indication bit-vector 1904 that correspond to the changed data value of the data change bit-vector 1902, for example, bits that correspond to the data field having the index #3, are set to "1", and other bits (e.g. placeholder bits) of the position indication bit-vector 1904 are set to "0" (though this convention may be changed such that bits that correspond to the data field having the index #3, are set to "0", and other bits of the position indication bit-vector 1904 are set to "1".

Hence, the position indication bit-vector 1904 generally indicates which bits of the data change bit-vector 1902 indicate changes that are to be made to corresponding bits of the data field bit-vector 1802. As such, the position indication bit-vector 1904 may alternatively be referred to as a mask vector, as the position indication bit-vector 1904 generally indicates that only those bits of the data change bit-vector 1902 that correspond to "1s" (e.g. at same positions as the "1s") should be used to update corresponding bits of the data field bit-vector 1802, and acts as a mask indicating to the replication computing node 500 which bits of the data change bit-vector 1902 to process and which bits to ignore.

As such, the primary computing node 300 provides (e.g. at the block 1608 of the method 1600) respective indications of the data change bit-vector 1902 and the position indication bit-vector 1904 to the replication computing node 500, for example in the form of the synchronization data 1900. It is understood that, while not depicted, the synchronization data 1900 further includes an identifier of the data field bit-vector 1802 (e.g. and/or the data field bit-vector 1702) and/or a message type indicator indicating that the synchronization data 1900 comprises a change to a data field.

Hence, the replication computing node 500 updates a respective stored data-set (e.g. data field bit-vector 1802) using the respective indications of the data change bit-vector 1902 and the position indication bit-vector 1904 to change a corresponding given field to the changed data value.

In particular, as depicted in FIG. 20, which is substantially similar to FIG. 19, with like components having like numbers, the replication computing node 500 has processed the synchronization data 1900 and changed the data field having an index #3 of the data field bit-vector 1802 from "110" to "001" of the data field bit-vector 1802, thereby aligning the of the data field bit-vectors 1702, 1802.

The replication computing node 500 performs such a change by determining that the three bits of the data change bit-vector 1902, that correspond to bits of "1" at the position indication bit-vector 1904, are to be used to change corresponding bits of the data field bit-vector 1802. The replication computing node 500 further determines that other bits of the data change bit-vector 1902, that correspond to bits of "0" (and/or placeholder bits) at the position indication bit-vector 1904, are to be ignored.

Furthermore, the replication computing node 500 may implement this change without retrieving the data field bit-vector 1802 from the replication database 515 and performing a comparison between data in the synchronization data 1900 and the data field bit-vector 1802.

As depicted in FIG. 19, the respective indications of the data change bit-vector 1902 and the position indication bit-vector 1904 respectively comprise the data change bit-vector 1902 and the position indication bit-vector 1904, themselves.

However, as there are many adjacent "0s" in each of the bit-vectors 1902, 1904, compression techniques, such run length encoding and variable length encoding described above, may be used to respectively compress the data change bit-vector 1902 and the position indication bit-vector 1904, and transmit compressed versions of the bit-vectors 1902, 1904 in the synchronization data 1900, rather than the bit-vectors 1902, 1904 themselves. Hence, in these examples, the method 1600 may further comprise generating respective indications of the data change bit-vector 1902 and the position indication bit-vector 1904 by compressing one or more of the data change bit-vector 1902 and the position indication bit-vector 1904. The compressing may include, but is not limited to, using one or more of run length encoding and variable length encoding, and the like. While the example bit-vectors 1702, 1802, 1902, 1904, as depicted, are only each 21 bits long, it is understood that such bit-vectors 1702, 1802, 1902, 1904 may be thousands of bits long, similar to the data field bit-vector 1002 of FIG. 10; hence, such compression, as described above, may lead to compression ratios of 150 to 200, and the like.

While the example of FIG. 18, FIG. 19 and FIG. 20 show a change at only one data field, the data change bit-vector 1902 and the position indication bit-vector 1904 may be adapted to show changes at more than one data field of the data field bit-vector 1702, with groups of "1s" at the position indication bit-vector 1904 all indicating bits of the data change bit-vector 1902 that are to be used to update the data field bit-vector 1802.

However, other implementations of the position indication bit-vector 1904 are within the scope of the present specification.

For example, attention is next directed to FIG. 21, which is substantially similar to FIG. 20, with like components having like numbers. However, a different implementation of a position indication bit-vector 2104 is depicted as being incorporated into synchronization data 2100 that is otherwise similar to the synchronization data 1900 and includes the data change bit-vector 1902.

Similar to the position indication bit-vector 1904, the position indication bit-vector 2104 comprises bits of a same number as the data change bit-vector 1902. However, in this example, respective bits of the position indication bit-vector 2104, that are at same respective positions as a first position and a last position of the changed data value of the data change bit-vector 1702, are of a different given binary value than other bits of the position indication bit-vector 2104 (e.g. which have a placeholder value). Hence, for example, a bit of the position indication bit-vector 2104 that is at a position that corresponds to the first bit of the data field having index "#3" is set to "1", and, similarly, a bit of the position indication bit-vector 2104 that is at a position that corresponds to the last bit of the data field having index "#3" is set to "1". Other bits of the position indication bit-vector 2104 are set to "0", including bits that correspond to bits between the first bit and the list bit of the data field having index "#3".

Such an example of a position indication bit-vector 2104 indicates to the replication computing node 500 that bits of the data change bit-vector 1902, that correspond to bits of "1" at the position indication bit-vector 1904, as well as bits that corresponds to bits that are between bits of "1" at the position indication bit-vector 1904, are to be used to change corresponding bits of the data field bit-vector 1802. It is further understood that bits of the data change bit-vector 1902 that correspond to bits of "0" at the position indication bit-vector 1904, and not between bits of "1", are to be ignored by the replication node 500. Put another way, bits between (and including) a pair of "1s" at the position indication bit-vector 1904 indicate, to the replication computing node 500, positions of the data change bit-vector 1902 that are to be used to update the data field bit-vector 1802.

It is further understood that for data fields of 2 bits, first and last bits may be adjacent and hence there may be no "0s" between a pair of "1s".

While the example of FIG. 21 shows a change at only one data field, the data change bit-vector 1902 and the position indication bit-vector 2104 may be adapted to show changes at more than one data field of the data field bit-vector 1702, with pairs of "1s" of the position indication bit-vector 2104 indicating respective groups of bits of the data change bit-vector 1902 that are to be used to update the data field bit-vector 1802. For example, a first bit of "1" of the position indication bit-vector 2104 is understood to be first bit in a first pair of "1s", while a next "1" is understood to be a last bit in the first pair of "1s". Similarly, a next "1" of the position indication bit-vector 2104 is understood to be first bit in a next pair of "1 s", and a next "1" is understood to be a last bit in the next pair of "1s", etc.

However, such an example may be challenging to implement when data fields of bit-vector 1702, 1802 have a length of 1 bit, for example as a first and last bit of a 1 bit data field are the same. As such, the example of FIG. 21 may be used in implementations of the system 100 where data fields of a data field bit-vector are more than 1 bit.

Attention is next directed to FIG. 22, which is substantially similar to FIG. 20, with like components having like numbers. However, a different implementation of a position indication bit-vector 2204 is depicted as being incorporated into synchronization data 2200 that is otherwise similar to the synchronization data 1900 and includes the data change bit-vector 1902.

Similar to the position indication bit-vector 1904, the position indication bit-vector 2204 comprises bits of a same number as the number of keys 1701 of the DSR 1700. However, in these examples, a bit of the position indication bit-vector 2204, that is at same respective position as a corresponding key 1701 of a same index as the changed data value of the data change bit-vector 1702, is of a different given binary value than other bits of the position indication bit-vector 2204 (e.g. which have a placeholder value). For example, as depicted, as there are six keys in the DSR 1700 indicating six data fields of the data field bit-vector 1702, and as a data field having an index of #1 is changed, as indicated by the data change bit vector 1902, the third bit of the position indication bit-vector 2204 is set to "1", while other bits are set to "0" (e.g. a placeholder value). Put another way, in such an implementation, a bit of "1" of the position indication bit-vector 2204 would indicate a position of a key 1701 that corresponds to a changed data field of the data field bit-vector 1702. Hence, in the example of FIG. 22, the position indication bit-vector 2204 may comprise six bits, for example one bit for each key 1701, and the third bit may be set to "1", and the remaining bits may be set to "0", for example to indicate that the data field of the data change bit-vector 1902 having an index #3 indicates a change to the data field of the data field bit-vector 1702 having index #3, and which is associated with the key 1701 having an index #3. The association between the changed bits of the data field bit-vector 1702, the position indication bit vector 2204, and the data change bit-vector 1902 are depicted in FIG. 22 via the lines 2205. Put another way, the position indication bit-vector 2204 comprises bits of a same number as a number of keys as the DSR structure 1700, with a bit of the position indication bit-vector 2204 that is at same respective position as a key 1701 that corresponds to the changed data value of the data change bit-vector 1902 being of a different given binary value than other bits of the position indication bit-vector 2204, to indicate a position of the data change bit-vector 1902 that represents the changed data value of the data field bit-vector 1702.

The example of FIG. 22 assumes, however, that the replication computing node 500 has access to indications of data field lengths of the respective stored data-set. Put another way, the example of FIG. 22 assumes that the replication computing node 500 has access to the DSR 1800 which indicates that the data field of the bit-vectors 1702, 1802 has a length of 3 bits (e.g. the DSR 1800 is the same as the DSR 1700 of FIG. 17). As such, in these examples, the replication computing node 500 may retrieve and/or read the DSR 1800 and compare the position of the "1" of the position indication bit-vector 2204 with the keys of the DSR 1800 and indicated lengths of the data fields of the data field bit-vector 1802 associated with the keys, and determine that the position of the "1" of the position indication bit-vector 2204 corresponds to a first bit of the data field having an index #3 of the data field bit-vector 1802. The replication node 500 further, determines from the DSR 1800, that the data field of the data field bit-vector 1802 having an index #3, is 3 bits in length. Hence, the replication node 500 updates the corresponding 3 bits of the data field bit-vector 1802, using the corresponding the 3 bits of the data change bit-vector 1902 that begin at the position indicated by the "1" of the position indication bit-vector 2204.

While the example of FIG. 22 shows a change at only one data field, the data change bit-vector 1902 and the position indication bit-vector 2204 may be adapted to show changes at more than one data field of the data field bit-vector 1702, with each "1" of the position indication bit-vector 2204 indicating a respective key 1701 associated with data fields of the data field bit-vector 1702 that have changed, and/or associated with respective groups of bits of the data change bit-vector 1902, that are to be used to update the data field bit-vector 1802.

The system 50 may be further adapted to synchronize changes to the databases 315, 515 using one or more of the caches 330, 530, as next described. For example, the implementations of FIG. 17, FIG. 18, FIG. 19, FIG. 20, FIG. 21 and FIG. 22 may be implemented as, in general, the primary computing node 300 may update the data field bit-vector 1702 without keeping a record, and the like, of previous values of data fields. As such, in these implementations, the primary computing node 300 may not have access to current values of data fields at the data field bit-vector 1802 at the replication database 515, at least between the data field bit-vector 1702 being updated at the primary database 315 and providing a data change bit-vector and a position indication bit-vector to the replication computing node 500.

However, in examples next described, the method 1600 may further include the primary computing node 300 (e.g. and/or any suitable engine thereof), maintaining a cache (e.g. the primary node cache 330) of previously changed data values and corresponding keys. Such a cache of previously changed data values and corresponding keys may be used to synchronize the replication database 515 when another change occurs to a data field indicated by one (or more) of the corresponding keys, as is next described.

Attention is next directed to FIG. 23 which depicts a portion of the system 50, similar to as depicted in FIG. 15, however with the caches 330, 530 respectively depicted at the computing nodes 300, 500. However, the bit-vectors 1702, 1802 are in the state depicted in FIG. 18, with the data fields having an index #3 having been respectively changed to a value of "001" at each of the bit-vectors 1702, 1802.

At FIG. 23, the primary computing node 300 has further stored, at the primary node cache 330, an indication of the third key (e.g. having an index #3) and the corresponding previously changed value of the data field having an index #3, While the value of the depicted key (e.g. LOR) is not depicted, the value may also be stored at the primary node cache 330. It is further understood that the indication of the third key and the corresponding previously changed value of the data field having an index #3 is stored at the primary node cache 330 with an identifier of the DSR 1700 and/or the data field bit-vector 1702.

As depicted, the replication computing node 500 has also stored an indication of the third key (e.g. having an index #3) and the corresponding previously changed value of the data field having an index #3 (e.g. also stored with an identifier of the DSR 1800 and/or the data field bit-vector 1802, which is understood to be the same as the identifier of the DSR 1700 and/or the data field bit-vector 1702).

However, as depicted, a change message 2304 is received at the primary computing node 300, for example from a data source 100, that indicates that a value of the data field having an index #1 is to be changed to "010" (e.g. from "101"), and that that a value of the data field having an index #3 is to be changed to "100" (e.g. from "001".

As such, with attention next directed to FIG. 24, which is substantially similar to FIG. 24, with like components having like numbers, the primary computing node 300 may transmit synchronization data 2400 to the replication node 500 that includes a data change bit-vector 2402, generated according to the method 1600, for the data field having an index #1. Hence, the first three bits of the data change bit-vector 2402 indicate the new data value of "010" for the data field having an index #1; furthermore, positions of the first three bits of the data change bit-vector 2402 correspond to positions of the bits of the data field having an index #1 at the data field bit-vector 1702, as indicated by the lines 2405.

Similarly, the first 3 bits of the position indication-vector 2404 have a value of "1", and positions of the first three bits of the position indication-vector 2404 correspond to positions of the bits of the data field having an index #1 at the data field bit-vector 1702, also as indicated by the lines 2405.

While the primary computing node 300 could adapt the bit-vectors 2402, 2404 to indicate the change to the data field having an index #3, as the primary computing node 300 has access, via the cache 515, to the previously changed value of "001", the primary computing node 300 (and/or the processing engine 322 and/or any suitable engine thereof) may determine a difference between the further changed data value and the previously changed data value stored at the cache 330. For example, a difference between the further changed value of the data field having an index #3 of "100" (e.g. as received in the change message 2304) and the previously changed value of "001" may be represented by 3 bits indicating which bits of the previously changed value of "001" have changed, such as "101", as is next described and which may be referred to a "difference indication".

In particular, a value of "1" at a difference indication of "101" indicates that a corresponding bit of the previously changed value of "001" has "flipped" from "1" to "0", or from "0" to "1"; conversely, a value of "0" at the difference indication of "101" indicates that a corresponding bit of the previously changed value of "001" has not flipped and/or not changed. Hence, comparing the previously changed value of "001" to the further updated value of "100", it is apparent that the first and third bits have changed values respectively from "0" to "1", and from "1" to "0", but the second bit has not changed. Hence the difference indication between the previously changed value of "001" to the further updated value of "100" is represented by "101".

Indeed, this difference indication is incorporated, by the primary computing node 300, at the data change bit-vector 2402 at positions corresponding to the data field having an index #3 at the data field bit-vector 2402, as indicated by the lines 2407. However, the corresponding bits of the position indication bit-vector 2404 are not changed (e.g. they remain at a value of "0" and/or at a placeholder value).

Hence, when the replication computing node 500 receives the synchronization data 2400, the replication computing node 500 may change the data field having an index #1 at the date field bit-vector 1802, as described above with respect to FIG. 19, based on the positions of the "1s" at the position indication bit-vector 2404 and using values of the corresponding bits of the data change bit-vector 2402, all corresponding to positions of the bits of the data field-bit-vector 1702 having an index #1.

However, for the non-zero bits of the data change bit-vector 2402, and in particular bits having a value of "1" of the data change bit-vector 2402, that do not correspond to bits of value "1" at the position indication bit-vector 2404, the replication computing node 500 flips and/or changes the value of the corresponding bits of the data field bit-vector 1802 accordingly. Hence, for the data field having an index of #3 at the data field bit-vector 1802, bits at positions corresponding to "1s" at the data change bit-vector 2402, that do not correspond to bits of value "1" at the position indication bit-vector 2404, are changed from "1" to "0", or "0" to "1" accordingly.

How such a change may occur depends on whether or not the replication computing node 500 is maintaining the replication node cache 530. For example, when the replication computing node 500 is maintaining the replication node cache 530, as described herein, the difference indication of "101" may be compared to the value of "001" of the corresponding key having an index of #3 stored at the replication node cache 530, and bits of the value of "001" are flipped accordingly to determine a value of "100" to write to the data field having an index #3 at the data field bit-vector 1802.

Alternatively, when the replication computing node 500 is not maintaining the replication node cache 530, a copy of the data field bit-vector 1802 may be retrieved from the replication database 515 and the difference indication of "101" may be compared to the value of the data field an index of #3 (e.g. "001"); bits of the value of "001" are flipped accordingly to determine a value of "100" to write to the data field having an index #3 at the data field bit-vector 1802. Such an implementation may take longer than when the replication computing node 500 is maintaining the replication node cache 530 due to the retrieval of the copy of the data field bit-vector 1802 from the replication database 515.

In either implementation, positions of bits whose values are to be changed at the data field bit-vector 1802 are determined from positions of the "1s" and/or non-zero bits of the data change bit-vector 2402 that do not correspond to bits of value "1" at the position indication bit-vector 2404.

Put another way, the method 1600 may be adapted based on change to a data field of a stored data-set comprising a further changed data value at a further given field of the stored data-set, the change being relative to a previously changed data value stored at the cache 330 in association with an identifier of a respective key of the DSR 1700. In these examples, the method 1600 may be adapted to further include the primary computing node 300 (and/or any the primary processing module 320 and/or any suitable engine thereof): determining one or more respective positions of bits that have changed in the further given data field; and incorporating, into the data change bit-vector 2402, at the one or more respective positions, a respective bit of a different given binary value than existing data placeholder bits (e.g. which, as depicted are "0").

It is further understood that, when only data fields change that correspond to previously changed data values and corresponding keys at the primary node cache 330, the position indication bit-vector 2404 may comprise all "0s" and/or the method 1600 may be adapted such that the position indication bit-vector 2404 is not generated, but the data change bit-vector 2402 only is transmitted in the synchronization data 2400, with the replication computing node 500 receiving the synchronization data 2400 without a position indication bit-vector 2404 indicating that the data change bit-vector 2402 indicates bits to be "flipped" at the data field bit-vector 1802. Indeed, the absence of a position indication bit-vector in synchronization data acts as an indication that a position indication bit-vector, if transmitted, would comprise bits all set to "0" and/or a placeholder value.

While the example of FIG. 23 and FIG. 24 has been described with respect to the position indication bit-vector 2404 having the format described with respect to the position indication bit-vector 1904, the position indication bit-vector 2404 may have any suitable format including, but not limited to, the formats of the position indication bit-vectors 2104, 2204 of FIG. 21 and FIG. 22.

It is further understood that, the caches 330, 530 may increase in size over time, which may unnecessarily use storage resources at the computing nodes 300, 500. Hence, in some examples, one or more of the computing nodes 300, 500 may delete a previously changed data value and a corresponding key from their respective caches 330, 530 based on any suitable technique including, but not limited to, one or more of:

A Time to Live (TTL) parameter, which defines, for example, a time period to store data at a cache 330, 530, and which may be preconfigured at one or more of the computing nodes 300, 500. For example, after a TTL time period has passed, after storing a respective previously changed data value and a corresponding key, the previously changed data value and the corresponding key may be deleted by a respective computing node 300, 500.

A Time Aware Least Recently Used (TLRU) parameter which defines a given number (e.g. 5, or any suitable number) of most recent previously changed data values and corresponding keys that are stored at respective caches 330, 530, and older previously changed data value and corresponding keys are respectively deleted by the computing nodes 300, 500. Hence, for example, the computing nodes 300, 500 may maintain only a most recent 5 previously changed data value and corresponding keys, however any suitable number is within the scope of the present specification.

A Least Frequent Recently Used (LFRU) parameter which defines that only previously changed data values and corresponding keys that undergo given numbers of changes within given time periods are maintained at respective caches 330, 530. Hence, for example, the LFRU parameter may define that previously changed data values and corresponding keys are maintained by the computing nodes 300, 500 at respective caches 330, 530 when they undergo 10 changes within 1 hour, and/or any suitable given number of changes within any suitable given time period. Previously changed data values and corresponding keys that do not meet the conditions specified by the LFRU parameter are deleted. In this manner, only data values of corresponding keys that change often (e.g. with "often" being defined by the LFRU parameters) are maintained at the caches 330, 530.

One or more machine learning algorithms; for example, one or more of the computing nodes 300, 500 may implement one or more machine learning algorithms trained to delete previously changed data values and corresponding keys based on any number of suitable factors (e.g. including, but not limited to, one or more of the TTL parameters, TLRU parameters, and the LFRU parameters, among other possibilities).

It is further understood that the techniques described may be combined in any suitable manner.

For example, attention is next directed to FIG. 25 which depicts synchronization data 2500 that may be transmitted from the primary computing node 300 to the replication computing node 500 when a data field bit-vector 2501, whose structure is defined by a DSR 2503, undergoes changes. The data field bit-vector 2501 and the DSR 2503 are understood to be stored at a primary database 315, and copies thereof at a replication database 515. While keys, data fields, and structures thereof are not depicted, the data field bit-vector 2501 and the DSR 2503 are understood to include have keys, data fields, and structures similar to other data field bit-vectors and DSRs described herein.

In particular, it is understood that the synchronization data 2500 indicates that a data "FIELD A" is being added to the data field bit-vector 2501 (e.g. in a manner similar to as depicted in FIG. 12 in that an unused field, not at the end of the data bit-vector is being used for the added data "FIELD B"), along with a corresponding data value, a data value of a data "FIELD B" of the data field bit-vector 2501 is being changed, and a data "FIELD C" of the data field bit-vector 2501 is also being changed that has a previously changed value stored at the primary node cache 330. Furthermore, the synchronization data 2500 indicates that another data field is being deleted, as next described.

As depicted, the synchronization data 2500 includes a CIBV 2502 indicating that a data field (e.g. the "FIELD A") is to be added to the data field bit-vector 2501 and another data field is to be deleted from the data field bit-vector 2501. Furthermore, the CIBV 2502 indicates the respective positions of the addition and the deletion at the to the data field bit-vector 2501, and a respective key position defined by the DSR 2503, as has been previously described. As also previously described, the computing nodes 300, 500 may determine which data field is to be added and which data field is to be deleted based on validity bits of the DSR 2503.

As such, synchronization data 2500 further includes a record 2504 which has a similar structure as the records 1516, 1518, but omits the data value. Rather, the synchronization data 2500 further includes a data change bit-vector 2512 and a position indication bit-vector 2514 having respective structures similar to the data change bit-vectors 1902, 2102 and the position indication bit-vectors 1904, 2104 (though the position indication bit-vector 2514 may alternatively have a structure similar to either of the position indication bit-vectors 2104, 2204). As will be described, the data value of the FIELD B is indicated by the data change bit-vector 2512 and the position indication bit-vector 2514.

However, rather than show all the specific "0s" and "1s" of the bit-vectors 2512, 2514, "0s" and "1s" of the bit-vectors 2512, 2514 are represented graphically with "1s" represented as black regions, and "0s" represented as white regions.

In particular, the data change bit-vector 2512 is adapted to include values of bits of the data value of the FIELD A at corresponding positions of the FIELD A at the data field bit-vector, and the position indication bit-vector 2514 includes bits having a value of "1" at corresponding positions of the FIELD A at the data field bit-vector. Regions of the data change bit-vector 2512 and the position indication bit-vector 2514 that correspond are indicated by dashed lines therebetween.

However, as a data value for a FIELD B is also being changed, the data change bit-vector 2512 includes values of bits of the data value of the FIELD B at the data field bit-vector, and the position indication bit-vector 2514 includes bits having a value of "1" at corresponding positions of the FIELD B at the data field bit-vector.

Furthermore, as the FIELD C that is being changed is understood to have a previously changed value stored at the primary node cache 330, the data change bit-vector 2512 include bits, at corresponding positions of the FIELD C at the data field bit-vector 2501, indicating which bits of the FIELD C are being "flipped".

As depicted, the synchronization data 2500 further includes a message type indicator 2516. Such a message type indicator 2516 indicates to the replication computing node 500 that the synchronization data 2500 includes data to update a corresponding DSR structure and an associated data field bit-vector, such that the replication computing node 500 receiving the synchronization data 2500 processes the synchronization data 2500 accordingly.

As should by now be apparent, the operations and functions of the devices described herein are sufficiently complex as to require their implementation on a computer system, and cannot be performed, as a practical matter, in the human mind. In particular, computing devices, and the lie, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot change topologies of a system, cannot transmit or receive electronic messages, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method for synchronization of data across databases to save network bandwidth, the method comprising:
   determining, at a computing node, that a stored data-set at a primary database has changed, the stored data-set comprising a plurality of data fields arranged in a predetermined layout defined according to a data-set representation (DSR) structure that defines for a given data-set, a structure of data fields which are associated with respective keys of the DSR structure, a change to the stored data-set comprising a deletion of an existing data field or an addition of a new data field;
   determining, at the computing node, a change indication bit-vector indicating one or more of a position of the change at the stored data-set and a respective key position defined by the DSR structure, wherein the change indication bit-vector comprises a plurality of bits arranged serially, each of the plurality of bits corresponding to a respective key position of the DSR structure;

when the change comprises the deletion of the existing data field, providing, to a replication node managing a replica database storing a replica of the stored data-set, an indication of the change indication bit-vector, such that the replication node updates the replica and a respective DSR structure to show deletion of the existing data field at the position indicated by the change indication bit-vector; and when the change comprises the addition of the new data field, providing, to the replication node the indication of the change indication bit-vector and a record of a key value of the new data field and a data value of the new data field, such that the replication node updates the replica and the respective DSR structure to show the addition of the new data field at the position indicated by the change indication bit-vector.

2. The method of claim 1, wherein a bit of the plurality of bits that indicates the position of the change has a first binary value, and other bits of the plurality of bits have a second binary value.

3. The method of claim 1, wherein the record further comprises one or more of a length of the key value, a length of the data value of the new data field, a respective length of the new data field, and a data type of the new data field.

4. The method of claim 1, further comprising compressing the indication of the change indication bit-vector prior to providing the change indication bit-vector to the replication node using one or more of a compression algorithm, run length encoding and variable length encoding.

5. The method of claim 1, wherein, when the addition of the new data field is indicated at an end of the DSR structure, the indication of the change indication bit-vector comprises the record.

6. The method of claim 1, wherein, when the addition of the new data field is indicated other than at an end of the DSR structure, the indication of the change indication bit-vector comprises the record and the change indication bit-vector in a compressed, or uncompressed format.

7. The method of claim 1, wherein, when the addition of the new data field is indicated other than at an end of the DSR structure, the addition of the new data field occurs at a respective position of the stored data-set that corresponds to a previously deleted data field or a previously unused data field.

8. The method of claim 1, wherein, when the change comprises both the deletion of the existing data field and the addition of the new data field, the change indication bit-vector indicates respective positions of both the deletion and the addition.

9. A computing node for synchronization of data across databases to save network bandwidth, the computing node comprising:

a processor configured to:

determine that a stored data-set at a primary database has changed, the stored data-set comprising a plurality of data fields arranged in a predetermined layout defined according to a data-set representation (DSR) structure that defines for a given data-set, a structure of data fields which are associated with respective keys of the DSR structure, a change to the stored data-set comprising a deletion of an existing data field or an addition of a new data field;

determine a change indication bit-vector indicating one or more of a position of the change at the stored data-set and a respective key position defined by the DSR structure, wherein the change indication bit-vector comprises a plurality of bits arranged serially, each of the plurality of bits corresponding to a respective key position of the DSR structure;

when the change comprises the deletion of the existing data field, provide, to a replication node managing a replica database storing a replica of the stored data-set, an indication of the change indication bit-vector, such that the replication node updates the replica and a respective DSR structure to show deletion of the existing data field at the position indicated by the change indication bit-vector; and when the change comprises the addition of the new data field, provide, to the replication node, the indication of the change indication bit-vector and a record of a key value of the new data field and a data value of the new data field, such that the replication node updates the replica and the respective DSR structure to show the addition of the new data field at the position indicated by the change indication bit-vector.

10. The computing node of claim 9, wherein a bit of the plurality of bits that indicates the position of the change has a first binary value, and other bits of the plurality of bits have a second binary value.

11. The computing node of claim 9, wherein the record further comprises one or more of a length of the key value, a length of the data value of the new data field, a respective length of the new data field, and a data type of the new data field.

12. The computing node of claim 9 wherein the processor is further configured to compress the indication of the change indication bit-vector prior to providing the change indication bit-vector to the replication node using one or more of a compression algorithm, run length encoding and variable length encoding.

13. The computing node of claim 9, wherein, when the addition of the new data field is indicated at an end of the DSR structure, the indication of the change indication bit-vector comprises the record.

14. The computing node of claim 9, wherein, when the addition of the new data field is indicated other than at an end of the DSR structure, the indication of the change indication bit-vector comprises the record and the change indication bit-vector in a compressed, or uncompressed format.

15. The computing node of claim 9, wherein, when the addition of the new data field is indicated other than at an end of the DSR structure, the addition of the new data field occurs at a respective position of the stored data-set that corresponds to a previously deleted data field or a previously unused data field.

16. The computing node of claim 9, wherein, when the change comprises both the deletion of the existing data field and the addition of the new data field, the change indication bit-vector indicates respective positions of both the deletion and the addition.

17. A non-transitory computer program product comprising computer-readable program code which, when executed by a computer, causes the computer to perform a method for synchronization of data across databases to save network bandwidth, the method comprising:

determining, at a computing node, that a stored data-set at a primary database has changed, the stored data-set comprising a plurality of data fields arranged in a predetermined layout defined according to a data-set representation (DSR) structure that defines for a given data-set, a structure of data fields which are associated with respective keys of the DSR structure, a change to the stored data-set comprising a deletion of an existing data field or an addition of a new data field;

determining, at the computing node, a change indication bit-vector indicating one or more of a position of the change at the stored data-set and a respective key position defined by the DSR structure, wherein the change indication bit-vector comprises a plurality of bits arranged serially, each of the plurality of bits corresponding to a respective key position of the DSR structure;

when the change comprises the deletion of the existing data field, providing, to a replication node managing a replica database storing a replica of the stored data-set, an indication of the change indication bit-vector, such that the replication node updates the replica and a respective DSR structure to show deletion of the existing data field at the position indicated by the change indication bit-vector; and when the change comprises the addition of the new data field, providing, to the replication node the indication of the change indication bit-vector and a record of a key value of the new data field and a data value of the new data field, such that the replication node updates the replica and the respective DSR structure to show the addition of the new data field at the position indicated by the change indication bit-vector.

* * * * *